United States Patent [19]
Cottrell et al.

[11] 4,227,734
[45] Oct. 14, 1980

[54] CAR HAUL TRAILER

[76] Inventors: Don J. Cottrell, 2164 Hawthorne La.; Don M. Cottrell, Rte. 7, Duckett Mill Rd., both of Gainesville, Ga. 30501

[21] Appl. No.: 920,189

[22] Filed: Jun. 29, 1978

[51] Int. Cl.² ............................................. B60P 3/08
[52] U.S. Cl. ..................................... 410/12; 410/26
[58] Field of Search .................... 296/1 A; 105/368 R

[56] References Cited
U.S. PATENT DOCUMENTS

| | | | |
|---|---|---|---|
| 1,931,803 | 10/1933 | Perkins et al. | 296/1 A |
| 2,598,113 | 5/1952 | Dawson | 296/1 A |
| 3,960,401 | 6/1976 | Harold | 296/1 A |

Primary Examiner—Richard A. Bertsch
Attorney, Agent, or Firm—B. J. Powell

[57] ABSTRACT

A car haul trailer for transporting vehicles which includes a trailer frame with a base frame and a pair of spaced apart upstanding side frames between which are mounted a plurality of fixed and movable track assemblies so that the track assemblies can be positioned in a plurality of positions to accommodate different loads of vehicles to be transported.

12 Claims, 25 Drawing Figures

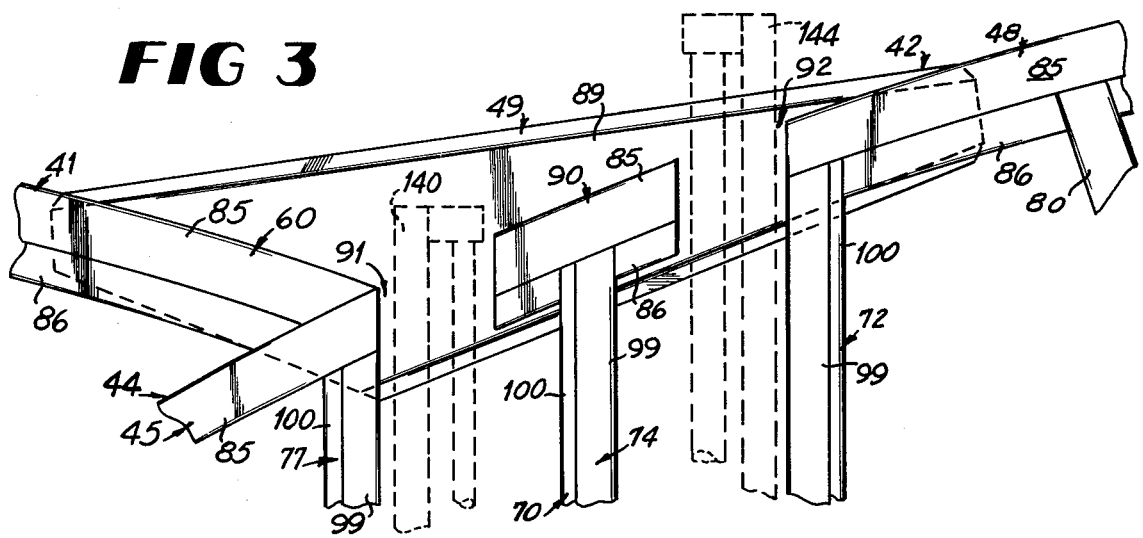
FIG 3
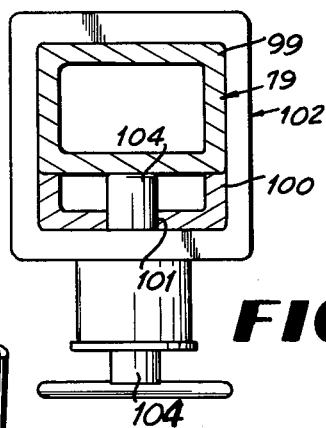
FIG 6
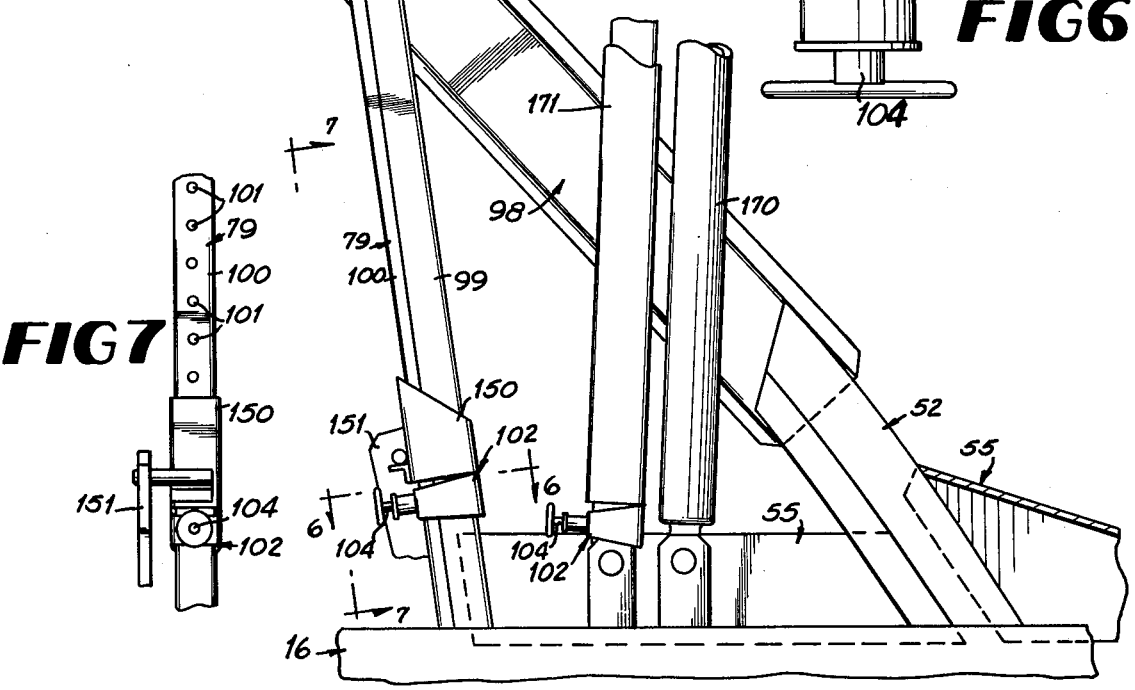
FIG 7
FIG 5

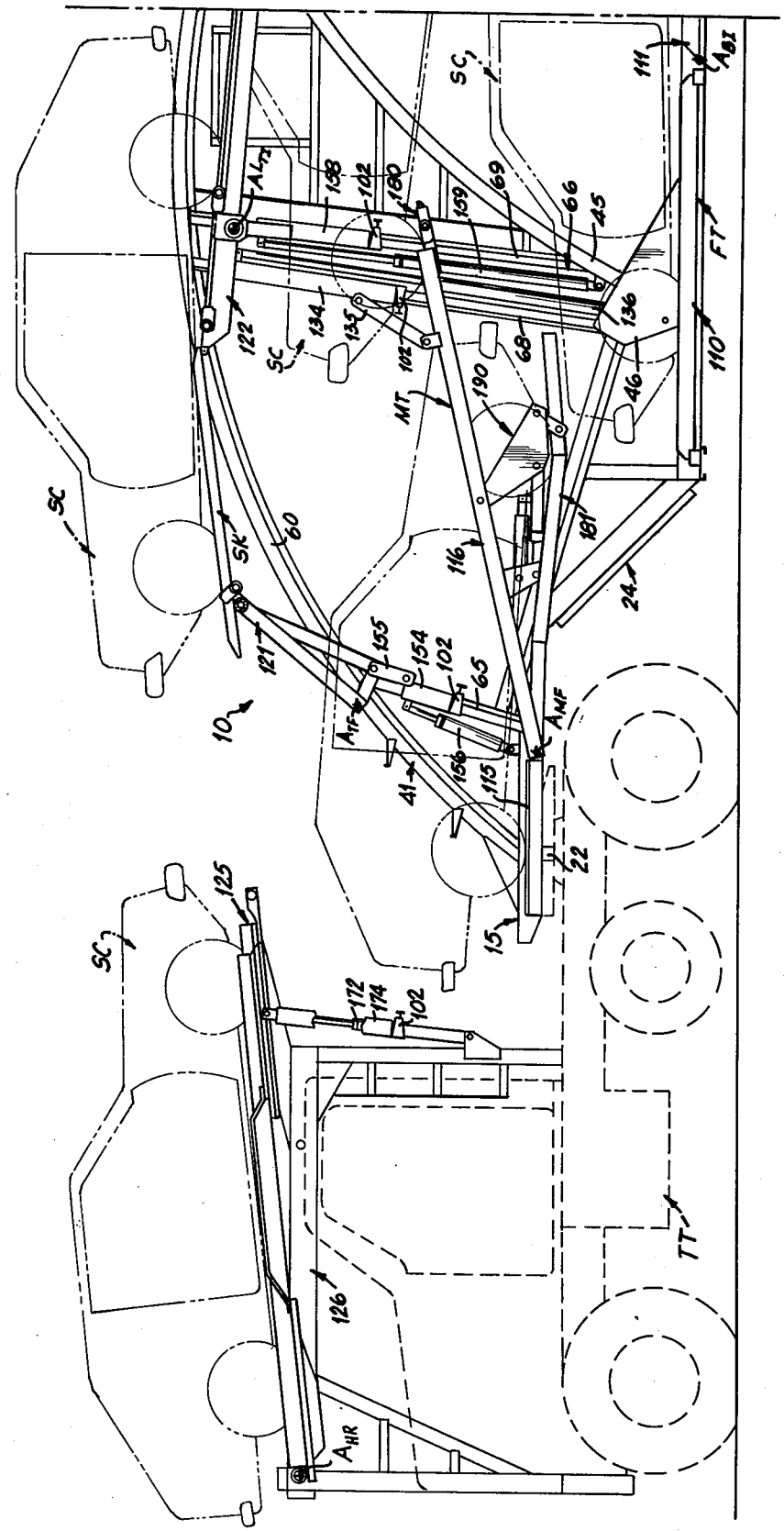

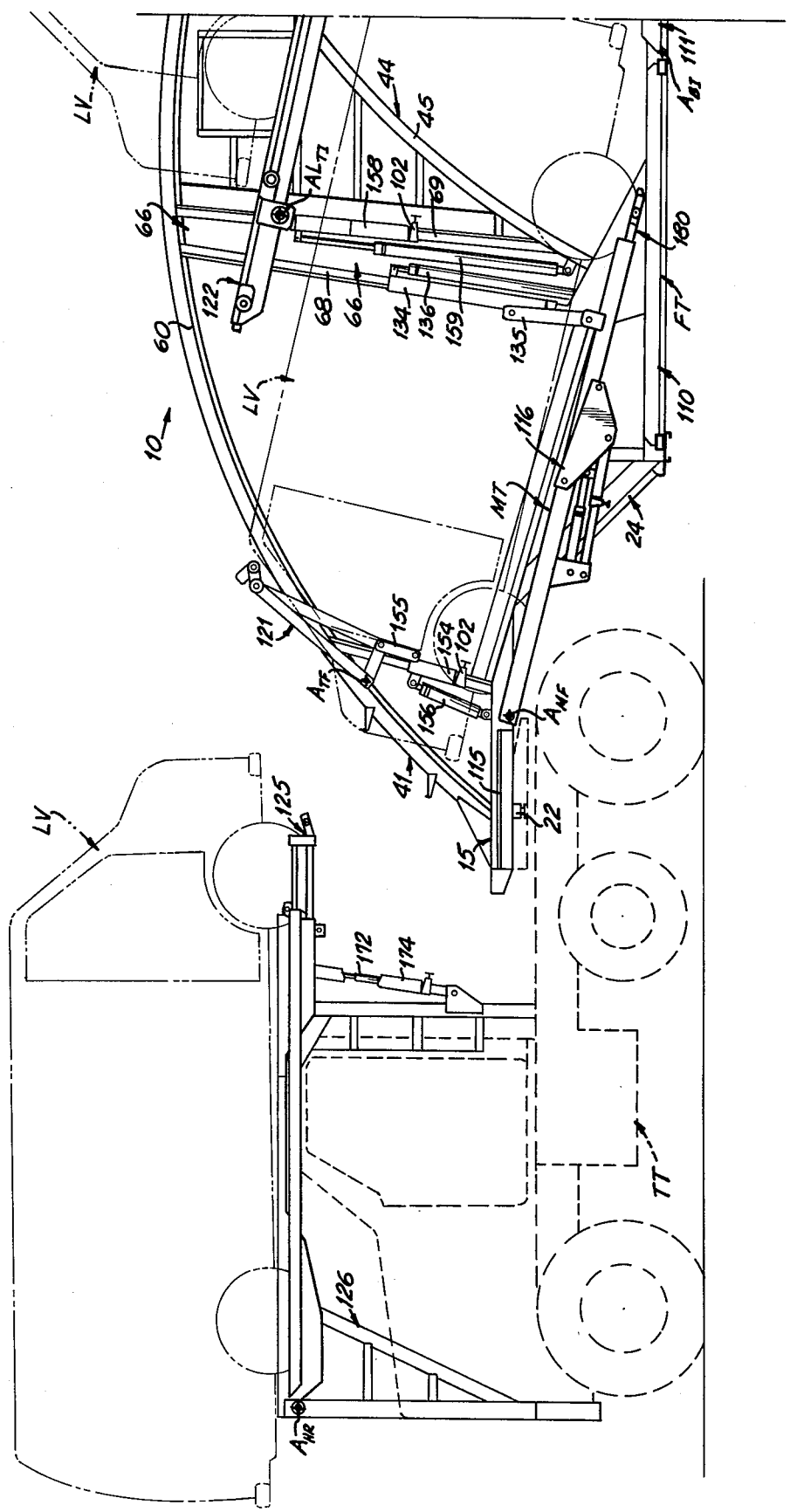

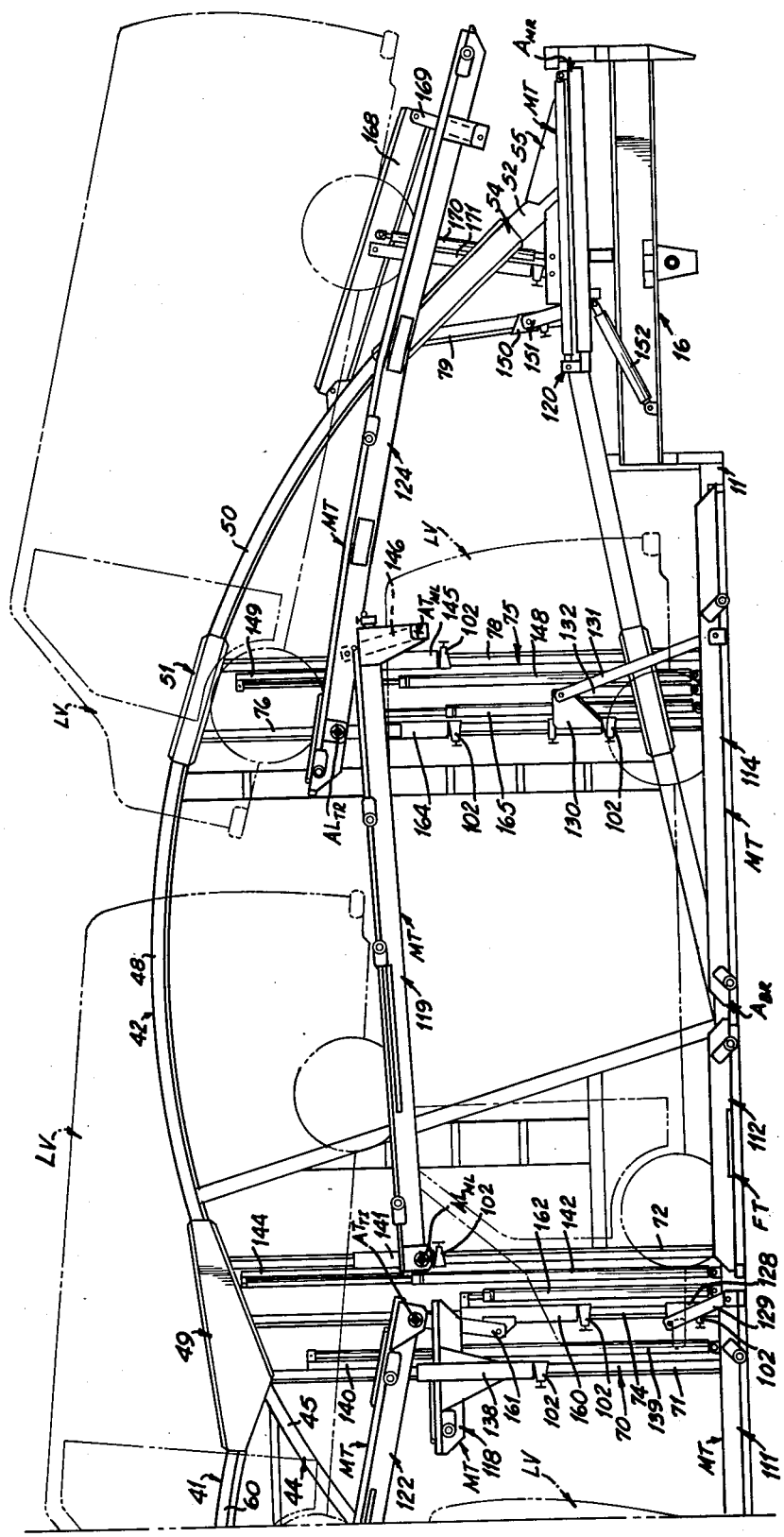

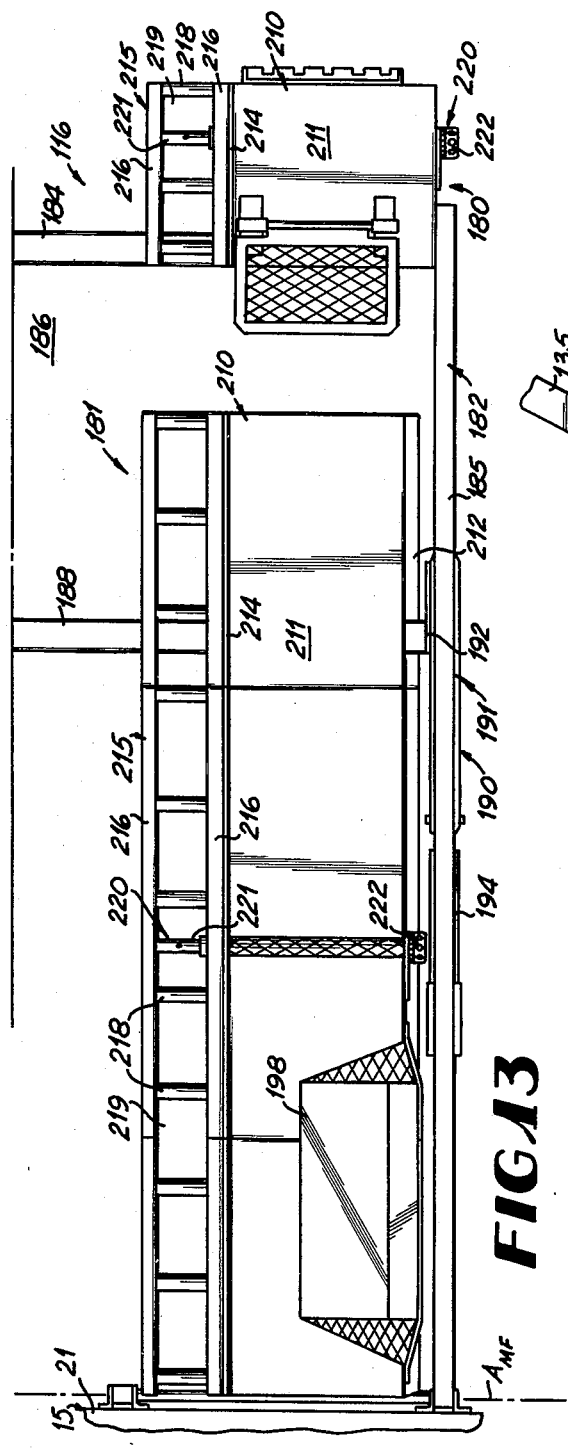
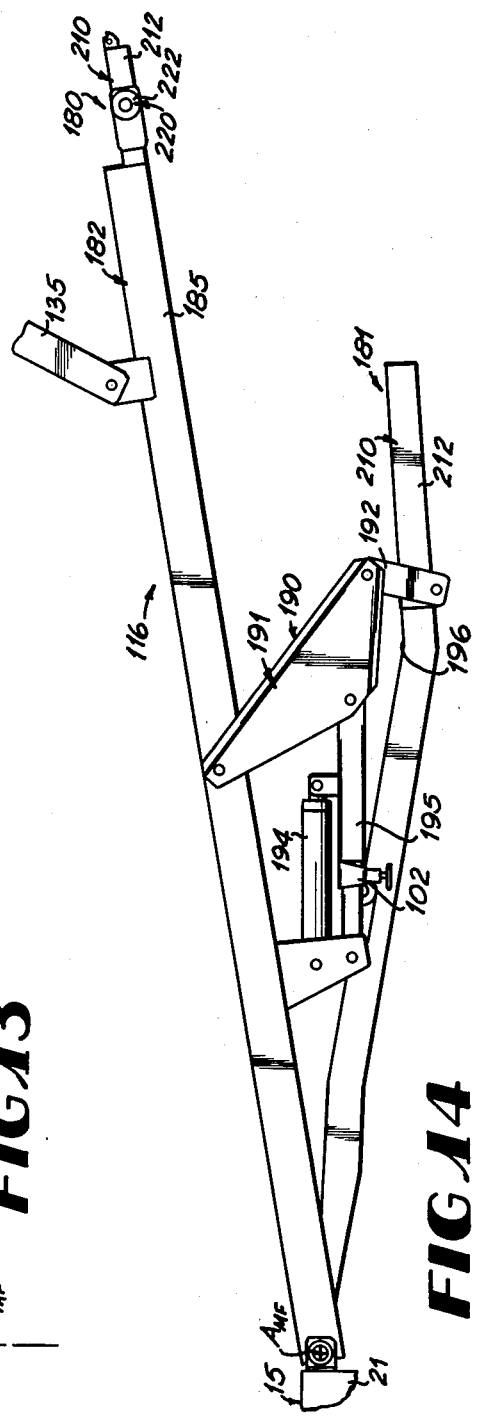
FIG.13
FIG.14

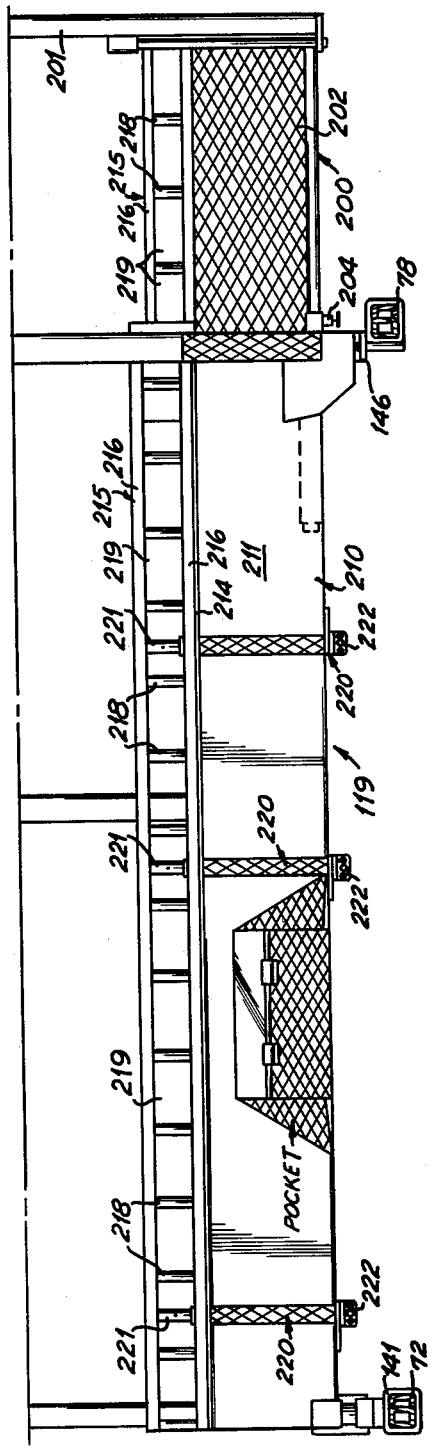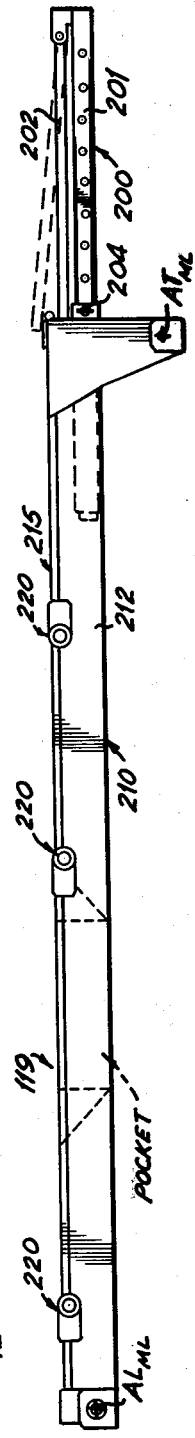
FIG. 15
FIG. 16

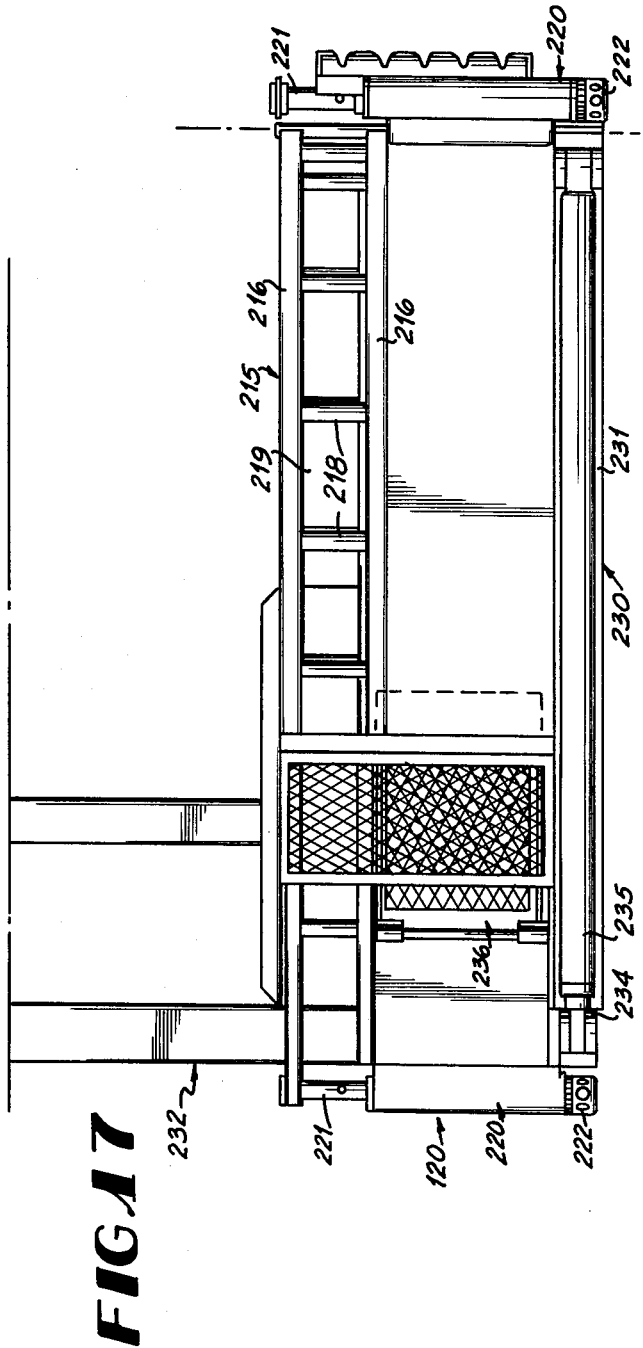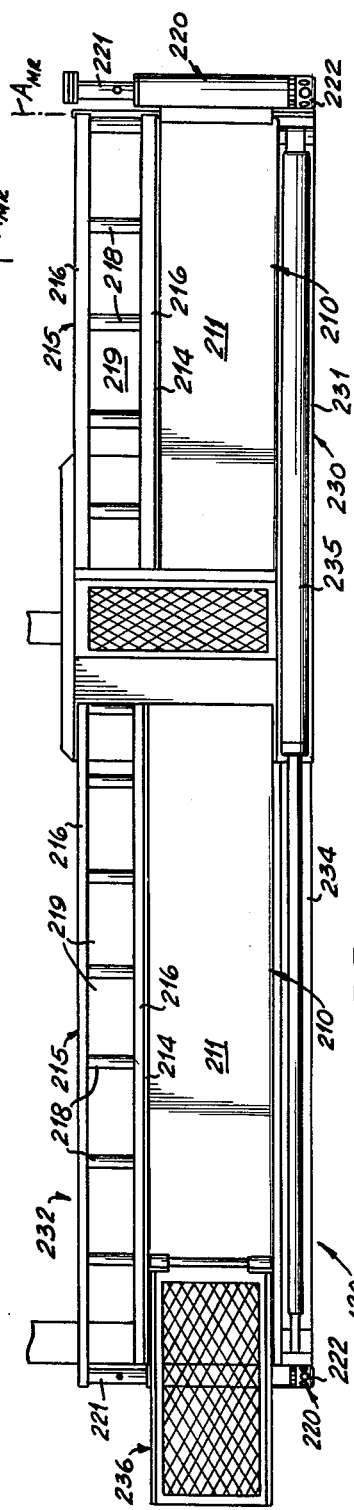

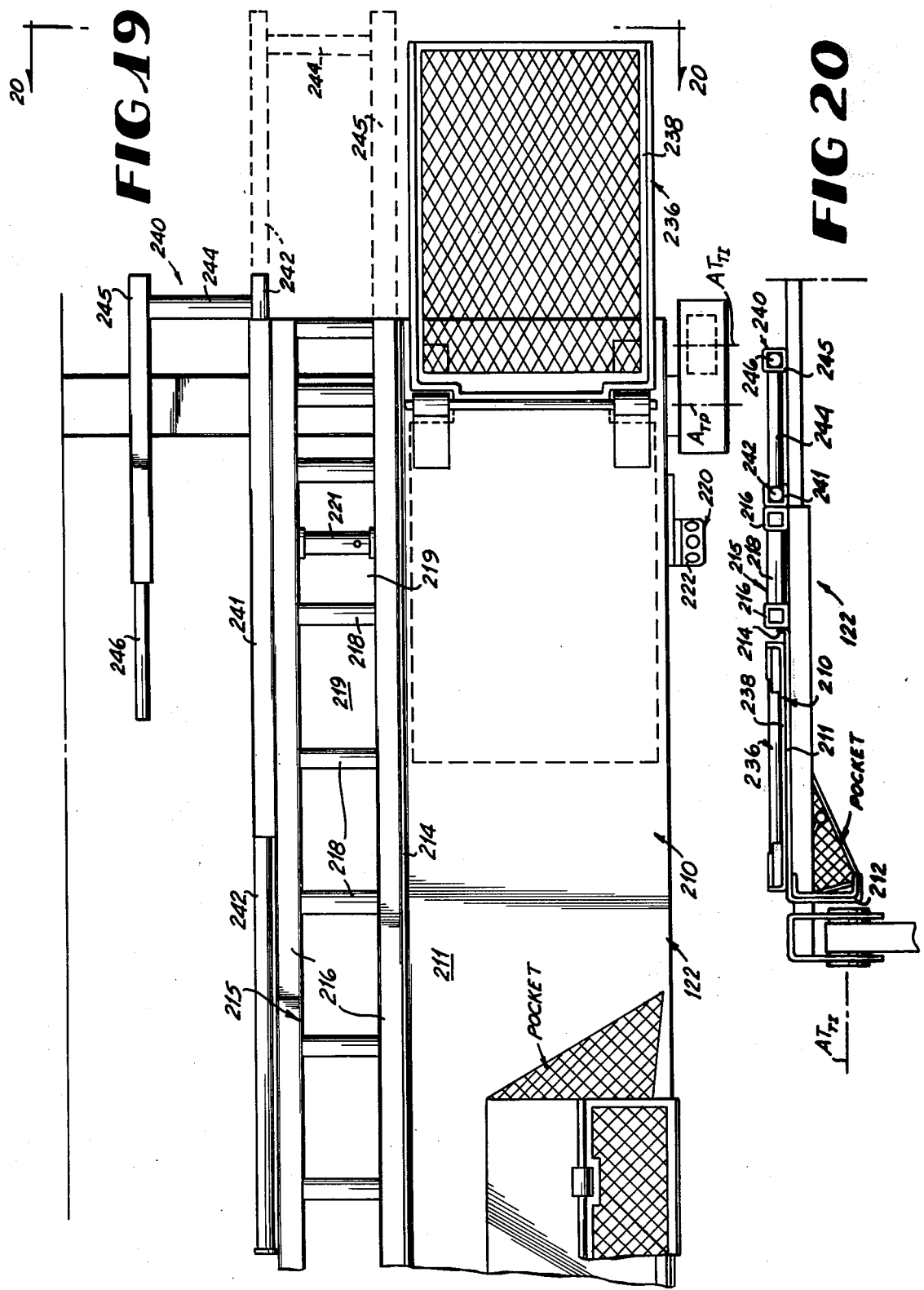

CAR HAUL TRAILER

BACKGROUND OF THE INVENTION

1. Field of the Invention

This invention relates generally to the transporting of vehicles and more particularly to the transporting of vehicles with a semi-trailer vehicle.

2. Background of the Invention

Most automobiles, vans and pickup trucks are transported today on semi-trailer trucks. The trailers used with these trucks usually have a plurality of track sections which can be shifted to different positions to accommodate different arrangements of the vehicles to be transported. In the past, the size of the various vehicles to be transported was about the same for each type of vehicle. Therefore, only the minimum adjustment capabilities of the track sections in the transporting trailers were required. More recently, however, the size of the various vehicles to be transported has varied widely for each type of vehicle. The limited adjustability of the track sections in prior art transporting trailers has prevented them from transporting the desired number of the different size vehicles in the loads to be transported. As a result, fewer than the desired number of some of the various types of vehicles included in the trailer loads could be transported or only certain types or sizes of the vehicles to be transported would be used to load a particular transporting trailer. In either instance, this required a greater number of transporting trailers than desired to transport the number of vehicles manufactured. Also, because many of the trailer loads transported exceeded the design strength of the trailers, the useful life of the prior art trailers was significantly reduced so as to require more frequent trailer replacement or repair than normally anticipated.

SUMMARY OF THE INVENTION

These and other problems associated with the prior art are overcome by the invention disclosed herein by providing a transporting trailer whose track sections are sized and adjustable so that the maximum number of each size and type of vehicle to be transported can be accommodated. Further, the different combinations of vehicle loads can be accommodated without exceeding the design load of the trailer.

The trailer incorporating the invention includes a base frame on which is mounted a pair of spaced apart, upstanding side frames to define a track receiving opening therebetween along the length of the trailer. The side frames are made of intersecting arches with at least one of the arches joined to the base frame at both of its ends to reinforce the trailer against fore and aft loading as a vehicle load is being transported. A plurality of support posts extend between the base frame of the trailer and the arched side members in the side frames.

A plurality of fixed and movable track sections are carried by the base frame and the support posts in the side frames so that the movable track assemblies can be shifted to different positions to accommodate different vehicular loads. Some of the track assemblies are pivoted about a fixed pivot axis generally normal to the path of movement of the trailer while other of the track assemblies are pivotally mounted about pivot axes which are vertically movable along the support posts mounting the track assemblies. One of the track assemblies is double-acting with a primary subassembly which defines an opening therein in which is fitted a secondary subassembly so that the primary and secondary subassemblies can be pivoted with respect to each other through a positioning mechanism. Both the primary and secondary subassemblies can be simultaneously pivoted together as well.

Each of the track assemblies includes a pair of spaced apart tracks which support the tires of the vehicle to be transported. A tie down assembly is provided along the length of the track on the inside edge of each which includes a plurality of guide tubes around which the flexible tensioning member connected to the vehicle to tie down the vehicle can extend to obtain the proper force direction for the tie down operation. Appropriate ratchet mechanisms are also provided that are operatively associated with the tie down assembly to tighten the flexible tie down member around the guide tubes in the guide assembly.

The track assemblies are arranged in three general levels, a bottom level, a middle level, and a top level. The front and rear track assemblies in the middle level are adjustable to cooperate with the other track assemblies in the middle level or with the other track assemblies in the bottom level to provide maximum configurational changes in the load carrying capability of the trailer. The front track assembly in the middle level of the trailer is arranged so that it can be loaded with vehicles either through the bottom level or through the middle level of track assemblies.

The arched side rails and the side frames are provided with gussett assemblies defining openings therethrough through which the positioning mechanisms of certain of the track assemblies can extend to increase the height adjustment capability of the track assemblies without the requirement of multiple action positioning cylinders.

The invention also includes a method of loading vehicles to obtain the maximum load configurations. The method of forming the small car load includes positioning the vehicles along the bottom, middle and top levels so that two small cars are positioned in the bottom level, three small cars are positioned in the top level, and four small cars are positioned in the middle level. The middle level is arranged by positioning the forwardmost small car in the middle level at the front end of the trailer so that it faces rearwardly and the secondmost forward car in the middle level is positioned so that it faces forwardly. The forward facing front end of the secondmost forward small car in the middle level extends over the rearwardly facing front end of the forwardmost car in the middle level. The rearwardly facing front end of the forwardmost car in the middle level also extends over the front end of the forwardly facing small car at the front end of the bottom level. The front end of the forwardly facing rearmost small car in the middle level extends over the rearwardly facing front end of the rear small car in the bottom level while the rearwardly facing front end of the next rearmost car in the middle level extends over the forwardly facing front end of the rearmost car in the middle level. By arranging the cars in this configuration, it is possible not only to carry nine small cars on the trailer, but also keep the cars in the middle level about horizontal.

The invention also includes the method of fabricating the support posts in the side frames of the trailer by punching a plurality of locking holes in a U-shaped channel and then welding the legs of the U-shaped channel to a seamless tube of a generally rectilinear cross-sectional shape to complete the formation of the support posts. Not only is the resulting support post stronger than using a single tubular member, but it is also very inexpensive to manufacture since the holes are punched rather than drilled.

These and other features and advantages of the invention disclosed herein will become more apparent upon consideration of the following description and accompanying drawings wherein like characters of reference designate corresponding parts throughout the several views and in which:

BRIEF DESCRIPTION OF THE DRAWINGS

FIG. 3 is an enlarged partial side view of one of the gusset assemblies of the invention with one of the gusset plates omitted;

FIG. 5 is an enlarged partial side view of another of the gusset assemblies of the invention with one of the gusset plates omitted;

FIG. 6 is an enlarged cross-sectional view taken along line 6—6 in FIG. 5;

FIG. 7 is a partial front view of one of the support posts taken along line 7—7 in FIG. 5;

FIGS. 8A and 8B are a matched view similar to FIG. 2 showing the track assemblies positioned for hauling compact cars;

FIGS. 9A and 9B are a matched view similar to FIG. 8 showing the track assemblies positioned for hauling long wheelbase vans;

FIG. 13 is an enlarged partial top view of the forward middle level track assembly;

FIG. 14 is a side view of the track assembly of FIG. 13;

FIG. 15 is an enlarged partial top view of the intermdiate middle level track assembly;

FIG. 16 is a side view of the track assembly of FIG. 15;

FIG. 17 is an enlarged partial top view of the rear middle level track assembly in its retracted position;

FIG. 18 is a reduced partial top view of the track assembly of FIG. 17 in its extended position;

FIG. 19 is an enlarged partial top view of the intermediate top level track assembly showing the short extension assembly;

FIG. 20 is an end view taken along line 20—20 in FIG. 19; and

Figure 1:
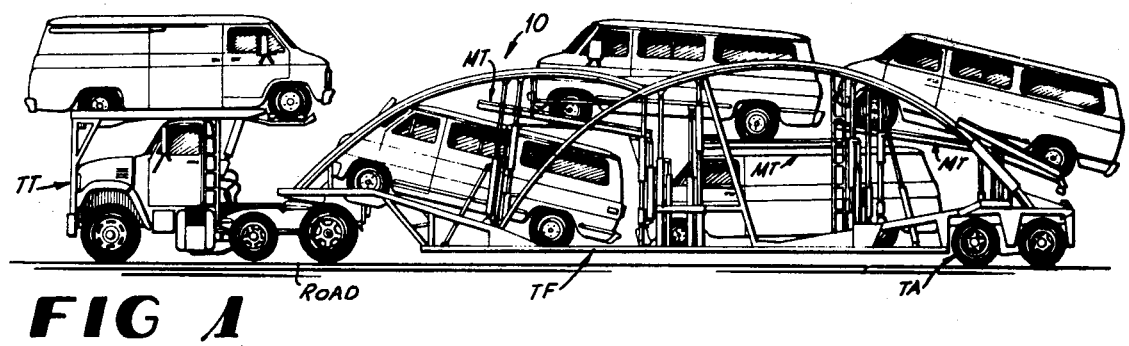
FIG. 1 is a small scale side view of the invention.

These figures and the following detailed description disclose specific embodiments of the invention; however, it is understood that the inventive concept is not limited thereto since it may be embodied in other forms.

DETAILED DESCRIPTION OF ILLUSTRATIVE EMBODIMENTS

As seen in the drawings, the invention is incorporated in a vehicle for transporting smaller vehicles and is commonly known as a car hauler or car carrier. The vehicles transported may be passenger cars, pickup trucks, vans and similar vehicles. Today, automotive manufacturers produce not only cars and station wagons commonly referred to as full size cars, but also small cars as well as intermediate size cars. Pickup trucks are also now manufactured in a variety of sizes. With the increased popularity of vans as recreational vehicles, manufacturers are now producing a variety of sizes of vans. The invention of this application is directed toward solving the problem of transporting the wide variety of different size vehicles by providing sufficient adjustability in the transporting vehicle to permit a single vehicle to transport the different sizes of vehicles to be transported while at the same time being able to transport the maximum number of vehicles in each load. The basic inventive concept is incorporated in a car haul semi-trailer 10.

Figure 2A:
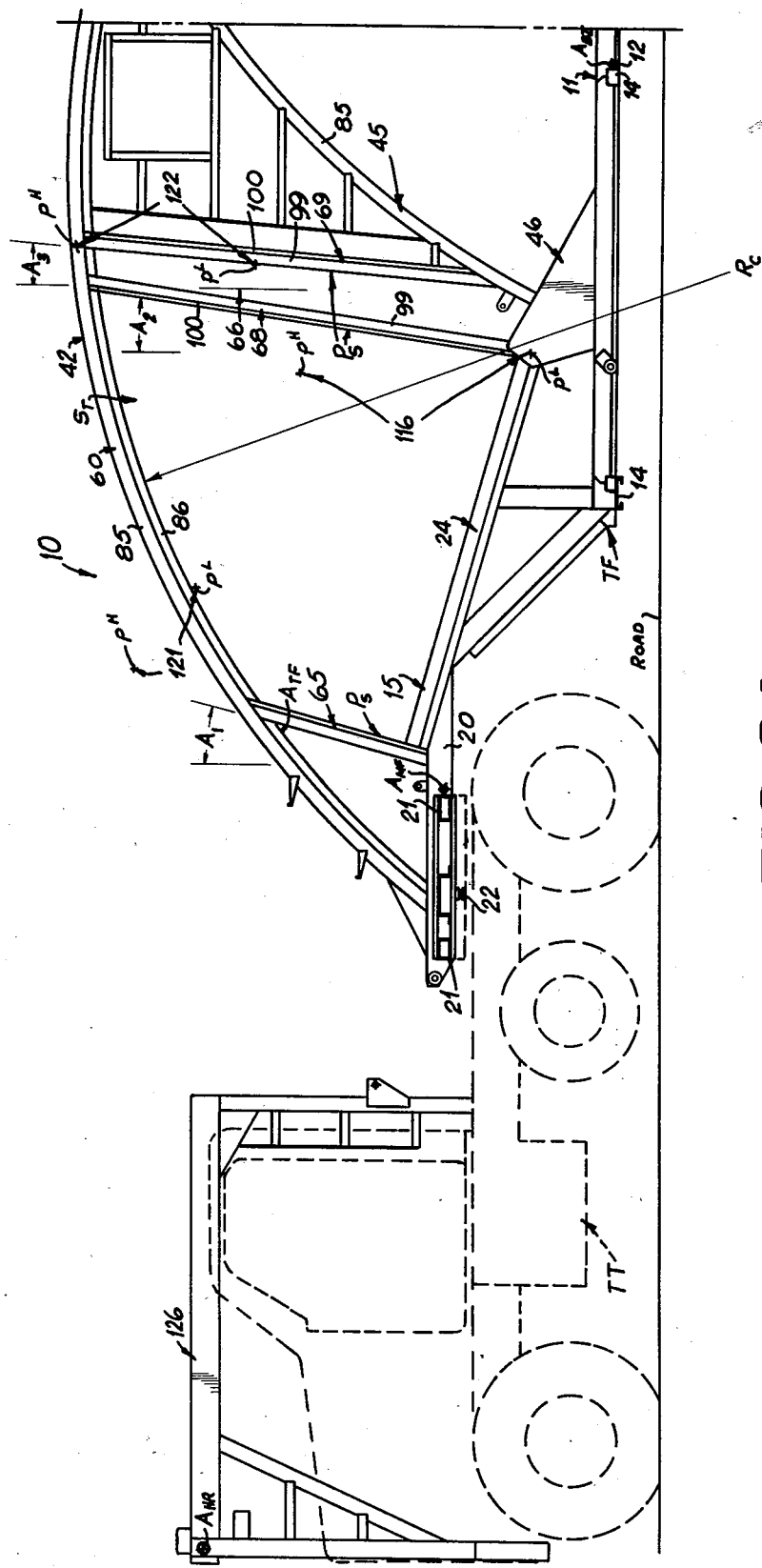
FIGS. 2A and 2B are a matched enlarged longitudinal cross-sectional view of the frame of the invention seen in FIG. 1.

The trailer 10, as seen in FIG. 1, includes a frame TF which mounts a plurality of movable track assemblies MT and a plurality of fixed track assemblies FT (FIGS. 2A and 2B) so that the movable track assemblies MT can be moved into different positions to accommodate different vehicular loads. The front of trailer 10 is connected to a truck tractor TT for towing and is provided with a tandem axle assembly TA at its rear end of conventional construction.

The trailer frame TF (FIGS. 2A and 2B) includes a lower central frame section 11 which includes a pair of spaced apart side rails 12 oriented generally parallel to the path of movement of the trailer 10. The side rails 12 are joined by a plurality of spaced apart cross members 14 oriented generally normal to the path of movement of trailer 10. The front end of the lower central frame section 11 is connected to a king pin frame section 15 and the rear end of the lower central frame section is connected to an axle frame section 16.

The king pin frame section 15 (FIG. 2A) includes a pair of spaced apart horizontal side members 20 parallel to the path of movement of trailer 10 with spaced apart cross members 21 therebetween. The king pin assembly 22 is connected between the side members 20 to connect the front end of trailer 10 to the fifth wheel assembly on the truck tractor TT. The rear ends of side members 20 are connected to the front end of the lower central frame section 11 by truss assemblies 24 so that the frame section 15 lies above and generally parallel to frame section 11.

The axle frame section 16 (FIG. 2B) includes longitudinally extending support beams 30 oriented generally parallel to the path of movement of trailer 10 which are connected by cross beams 31 normal to the path of movement. The front end of the axle frame section 16 is connected to the rear end of the lower central frame section 11 by step assembly 32 so that the axle frame section 16 is generally parallel to frame section 11 and spaced thereabove. The axle frame section 16 mounts the tandem axle assembly TA thereon. The axle frame section 16 is also connected to the lower central frame section 11 by a pair of angled side rails 34 to reinforce the step assembly 32.

The trailer frame TF also includes a pair of spaced apart vertically oriented side frame sections 40 (FIGS.

2A and 2B) interconnecting the lower central, king pin, and axle frame sections 11, 15 and 16 along their outside edges so that an open top load carrying space $S_T$ is defined between side frame sections 40 in which the track assemblies MT and FT are mounted. Each side frame section 40 includes front and rear primary arcuate side rail assemblies 41 and 42 with the front and rear side rail assemblies 41 and 42 connected together and extending from the king pin frame section 15 to the axle frame section 16. A secondary arcuate side rail assembly 44 forms a continuation of the rear primary side rail assembly 42 and connects the rear side rail assembly 42 to the lower central frame section 11. It will be noted that the side rail assemblies 41, 42 and 44 have a radius of curvature $R_C$ (FIGS. 2A and 2B) with the rear primary side rail assembly 42 and the secondary side rail assembly 44 having a common center of curvature while the center of curvature of the front primary side rail assembly 41 is located forwardly of the back center of curvature so that the arc of the front primary side rail assembly 41 intersects the arc of the rear primary side rail assembly 42.

When the trailer frame TF is loaded with vehicles to be transported, the forces acting on the frame are generally directed downwardly while the trailer is stopped. When the loaded trailer is moving, these forces not only act downwardly, but also with forwardly and/or rearwardly directed components of force, especially during the acceleration and deceleration of the trailer. Because the braking systems are good, the forwardly directed force components during deceleration can become quite large and sometimes exceed the downwardly directed force components. Because the secondary side rail assembly 44 forms a continuation of the rear primary side rail assembly 42, the forwardly directed component of these deceleration forces is smoothly transferred along the secondary side rail assembly 44 as well as along the front primary side rail assembly 41 into the lower sections of the trailer frame rather than along sharply curved paths associated with the prior art. As a result, the trailer frame TF can easily absorb the acceleration and deceleration forces without collapsing.

Another advantage associated with the arcuate side rail construction is that the side framework is very open. This is extremely important since the driver loading and unloading the vehicles on the trailer must be able to exit and enter the vehicles. The arched construction minimizes the required angled truss bracing in the side rail assemblies and thus permits easy entry into and exit from the vehicles being loaded onto the trailer 10.

The front primary side rail assembly 41 (FIGS. 2A and 2B) includes a front arcuate side rail 60 connected at its front end to the king pin frame section 15 by gusset assembly 61. The side rail 60 extends upwardly and rearwardly from king pin frame section 15 and is connected at its rear end to the transfer gusset assembly 49 which connects the higher ends of both primary side rail assemblies 41 and 42 as well as the secondary side rail assembly 44.

Figure 2B:
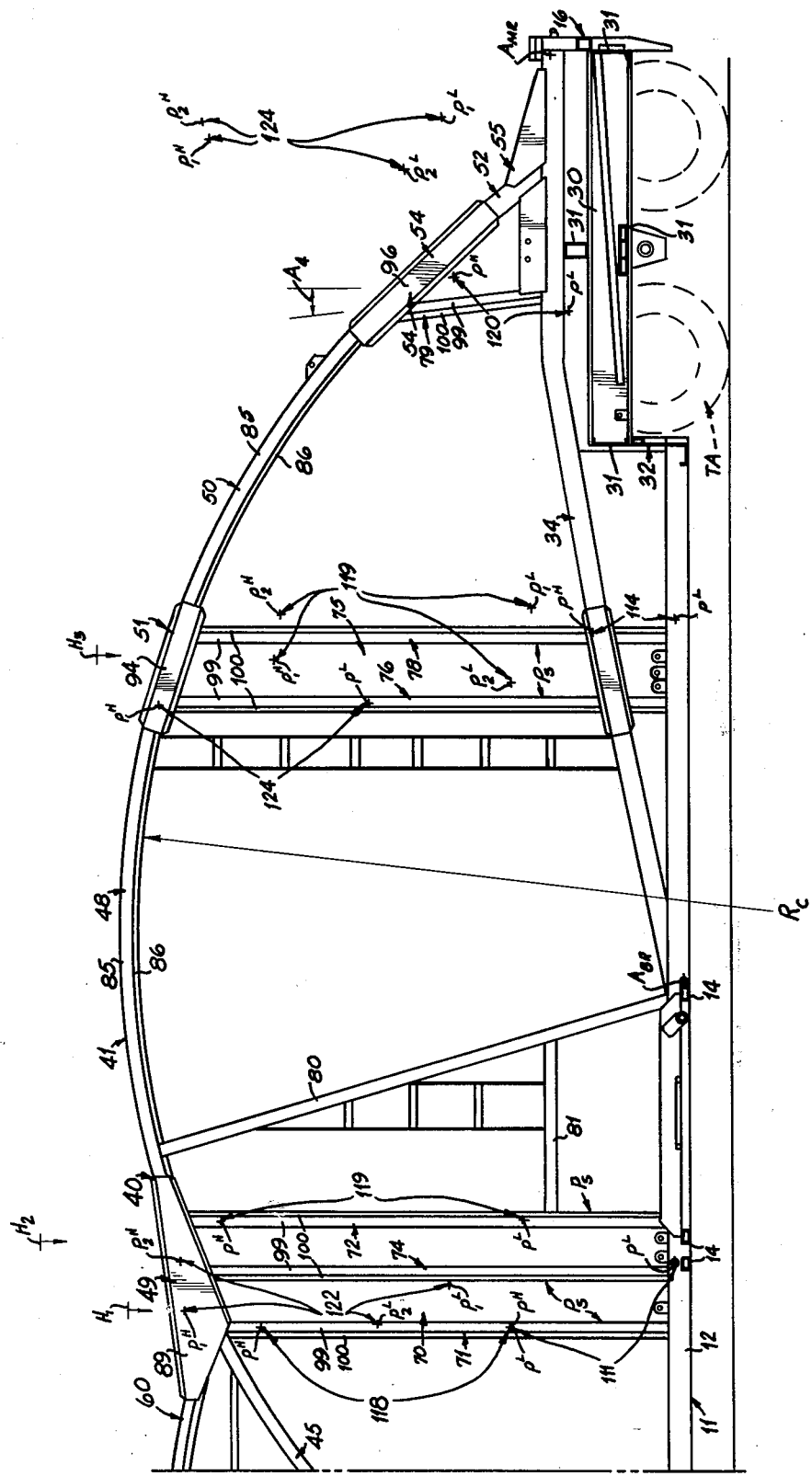

The rear primary side rail assembly 42 includes a rear arcuate side rail 62 connected at its front end to assemblies 41 and 44 through gusset assembly 49. The side rail 62 curves rearwardly and downwardly from gusset assembly 49 to the axle frame section 16 through gusset assembly 55 (FIG. 2B). The secondary side rail assembly 44 has a secondary side rail 45 which is connected to gusset assembly 49 and extends forwardly and downwardly therefrom to the juncture of the lower central frame section 11 with the truss assembly 24 connecting the king pin frame section 15 with the central frame section 11. Gusset assembly 46 connects the forward lower end of secondary side rail 45 to both the central frame section 11 and the truss assembly 24.

The rear side rail 62 (FIG. 2B) includes a top front side rail section 48, an intermediate side rail section 50, and a rear side rail section 52 which are connected end-to-end by gusset assemblies 51 and 54 so that they lie along a common arcuate path of the radius $R_C$ about a common center of curvature with the secondary side rail assembly 44. The gusset assembly 51 connects the trailing end of section 48 with the leading end of section 50 while the gusset assembly 54 connects the leading end of the rear section 52 with the trailing end of the intermediate section 50.

The side frame sections 40 also include a plurality of support posts $P_S$ (FIGS. 1 and 2) that movably mount the movable track assemblies MT. The support posts $P_S$ are connected at their upper ends to the side rail assemblies 41, 42 and 44 so that the longitudinal loading is transmitted via posts $P_S$ to the side rail assemblies. Corresponding posts $P_S$ in opposite side frame sections 40 are laterally alinged with each other across the trailer frame.

Front support posts 65 (FIG. 2A) extend between side members 20 in the king pin frame section 15 and the forward portions of the front side rails 60 and the front primary side rail assembly 41. The front support posts 65 are angled rearwardly from the vertical at angle $A_1$.

Front primary support post assemblies 66 (FIG. 2A) extend between the front ends of secondary side rail sections 45 at the gusset assemblies 46 and the upper portions of the front side rail 60. Each front primary support post assembly 66 includes a leading support post 68 extending between the gusset assembly 46 and the front side rail 60 at an angle $A_2$ rearwardly from the vertical. Each front primary support post assembly 66 also includes a trailing support post 69 extending between the secondary side rail 45 adjacent the gusset assembly 46 and the top portion of the front side rail 60 at an angle $A_3$ rearwardly of the vertical.

Intermediate primary support post assemblies 70 (FIG. 2B) extend between side rails 12 in the lower central frame section 11 and gusset assemblies 49 connecting the side rail assemblies 41, 42, and 44. Each support post assembly 70 includes a leading post 71, a trailing post 72, and an intermediate post 74 between posts 71 and 72. The posts 71, 72 and 74 are generally vertically oriented and spaced from each other longitudinally of the trailer.

Rear primary support post assemblies 75 (FIG. 2B) extend between gusset assemblies 51 connecting the top and intermediate side rail sections 48 and 50 in rear primary side rail assemblies 42 and side rails 12 in the lower central frame section 11. Each rear primary support post assembly 75 includes spaced apart leading and trailing support posts 76 and 78 which are generally vertically oriented.

Rear support posts 79 (FIG. 2B) connect gusset assemblies 55 with gusset assemblies 54 connecting the intermediate and rear side rail sections 50 and 52 in rear primary side rail assemblies 42. Each support post 79 angles forwardly of the vertical at angle $A_4$.

Braces 80 (FIG. 2B) connect each top side rail section 48 with each side rail 12. Horizontal side braces 81 connect each brace 80 with the trailing post 72 in the intermediate primary support post assembly 70.

The side rail sections 48, 50, 52 and 60 in the primary side rail assemblies 41 and 42 have similar cross-sectional shapes. Each has an upper primary square tube 85 longitudinally curved as seen in FIG. 2 along the bottom of which is welded a U-shaped channel 86. The channel 86 thus reinforces the tube 85. Each of the posts 65, 68, 72, 74, 76, 78 and 79 extend through cutouts in the channel 86 and are attached directly to the primary tube 85 at their upper ends. The channel 86 is also attached to the side of the posts for reinforcement.

Figure 4:
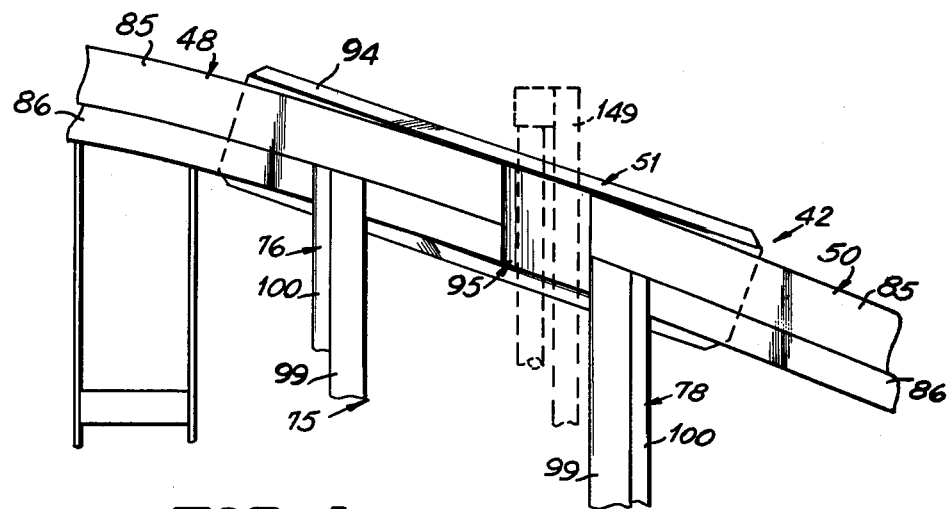
FIG. 4 is an enlarged partial side view of another of the gusset assemblies of the invention with one of the gusset plates omitted.

The gusset assemblies 49, 51, and 54 define vertical openings therethrough to provide operating clearance for the positioning mechanisms to the movable track assemblies MT as best seen in FIGS. 3-5. The gusset assembly 49 seen in FIG. 3 has a pair of opposed gusset plates 89 (one seen in FIG. 3) which are generally triangular in shape. The plates 89 are welded to opposite sides of the front side rail 60 at one corner, the secondary side rail 45 at another corner, and the top side rail section 48 of rear side rail 62 at the third corner. The side rail 60 extends to and is joined to the side rail 45 between plates 89, and the upper end of the leading post 71 of the intermediate primary support post assembly joins with the side rail 45 at this joint. The upper end of the trailing post 72 joins with the leading end of the top side rail section 48 between gusset plates 89 rearwardly of the joint between post 71, side rail 60 and side rail 45. A stub rail section 90 is mounted between gusset plates 89 between and in arcuate alignment with side rail section 48 and side rail 45 so that a vertically oriented front opening 91 is defined between rail 45 and the stub rail section 90 immediately behind post 71 and a vertically oriented rear opening 92 is defined between stub rail section 90 and top rail section 48 immediately ahead of post 72. The upper end of intermediate post 74 is joined to stub rail section 90.

The gusset assembly 51 seen in FIG. 4 has a pair of gusset plates 94 (one seen in FIG. 4) generally rectilinear in shape welded to opposite sides of side rail sections 48 and 50. The upper end of the leading support post 76 is attached to the side rail section 48 between gusset plates 94 just forward of the trailing end of section 48 while the upper end of the trailing post 78 in the rear primary support post assembly 75 is attached to the leading end of the side rail section 50 between gusset plates 94. The trailing end of the side rail section 48 is maintained in arcuate registration with the leading end of side rail section 50 and is spaced forwardly thereof to define a vertically oriented opening 95 just forwardly of the post 78.

The gusset assembly 54 has a pair of gusset plates 96 (one seen in FIG. 5) connecting opposite sides of the side rail sections 50 and 52 so that facing ends of the side rail sections are arcuately aligned and spaced apart to define an opening 98 therebetween. The upper end of the rear post 79 joins with the trailing end of side rail section 50 between gusset plates 96.

Figure 21:
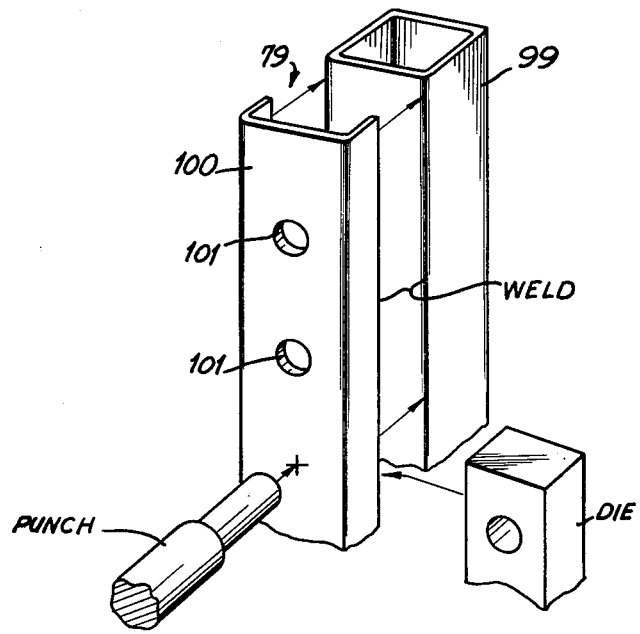
FIG. 21 is a view illustrating the support post construction.

Each of the support posts 65, 68, 69, 71, 72, 74, 76, 78 and 79 have a cross-sectional shape similar to the side rails with a primary seamless tube 99 to one side of which is welded a U-shaped channel 100. FIGS. 6, 7 and 21 illustrate the post construction. Before the channel 100 is welded onto the tube 99, locking holes 101 are formed in the web of channel 100 as best seen in FIG. 21. Because the inside of the web on channel 100 is still accessible, hole forming operations which are faster and more economical than drilling can be used. One of the fastest and least expensive methods is to use a punch and die as seen in FIG. 21 to punch the holes. Normally, a multiple punch press is used which permits the simultaneous formation of most of the holes 101 in a fast single step operation. After the holes are punched, the channel 101 is welded to the side of the tube 99. This welding process may likewise be automated. Because the holes 101 are not formed through the side walls of the tube 99, the structural integrity of the finished support post is maintained.

Locking clamps 102 (FIGS. 6 and 7) are slidably mounted on the support posts with a spring urged locking pin 104 which fits in any selected hole 101 to adjustably and positively lock clamp 102 in selected positions along the length of the posts. The clamps 102 serve to lock the movable track sections MT in position along the posts as will become more apparent.

The track assemblies MT and FT seen in FIG. 8 are carried by the lower central, king pin and axle frame sections 11, 15 and 16 and the side frame sections 40 so that different loads of different types of vehicles can be carried. The track assemblies MT and FT are arranged generally along three horizontal levels; a bottom level, a middle level and a top level so that vehicles may be loaded onto the trailer 10 along the three levels.

The lower central frame section 11 mounts the bottom level track assemblies. There are two movable track assemblies MT and two fixed track assemblies FT on the bottom level. The forward end of the lower central frame section 11 mounts a forward bottom level fixed horizontal track assembly 110 immediately behind the king pin frame section 15. Immediately behind the forward bottom level fixed track assembly 110 is a pivotally mounted intermediate bottom level track assembly 111 which pivots about a fixed horizontal axis $A_{BI}$ between the side rails 12 normal to the path of movement of the trailer 10. Immediately behind the track assembly 111 is an intermediate bottom level fixed horizontal track assembly 112. Immediately behind the track assembly 112 and immediately forward of the axle frame assembly 116 is a rear bottom level track assembly 114 which pivots about a fixed horizontal axis $A_{BR}$ between side rails 12 normal to the path of movement of the trailer 10.

The middle level track assemblies are mounted on the king pin and axle frame sections 15 and 16 along with the primary support post assemblies 66, 70 and 75. There are four movable track assemblies MT and one fixed track assembly FT in the middle level. A front middle level horizontal fixed track assembly 115 is mounted over the king pin assembly 22. Immediately therebehind is a forward middle level track assembly 116 pivoted between the side members 20 and king pin frame assembly 15 about a fixed horizontal pivot axis $A_{MF}$ oriented normal to the path of movement of trailer 10. Spaced rearwardly of the track assembly 116 is a vertically movable intermediate middle level horizontal, short track assembly 118 movably mounted between the leading posts 71 in the intermediate support post assembly 70. Immediately rearwardly of the short track assembly 118 is an intermediate middle level long track assembly 119 movably mounted between the trailing posts 72 in the intermediate primary support post assembly 70 and the trailing support posts 78 in the rear primary support post assembly 75 so that the leading end of track assembly 119 is pivoted about horizontal axis $AL_{ML}$ which can be moved up and down the trailing posts 72 while the trailing end of track assembly 119 is pivoted about a floating horizontal pivot axis $AT_{ML}$ which can be moved up and down the trailing support posts 78. A rear middle level track assembly 120 is pivotally mounted on the axle frame section 16 about a fixed horizontal axis $A_{MR}$ normal to the path of movement of trailer 10.

The top level track assemblies are mounted on the front support post 65; the front, intermediate and rear primary support post assemblies 66, 70 and 75; and the primary arcuate side rail assembly 42. There are two movable track assemblies MT and one movable skid support assembly in the top level. The front support posts 65 and the front side rails 60 movably mount a front top level skid support assembly 121 for arcuate swinging movement about a fixed horizontal axis $A_{TF}$ between the front side rails 60 and normal to the path of movement of the trailer 10. An intermediate top level track assembly 122 is positioned rearwardly of the skid support assembly 121, and movably mounted on the trailing support posts 69 of the front primary support post assembly 66 and the intermediate post 74 in the intermediate primary support post assembly 70. The leading portion of the track assembly 122 is pivoted about horizontal axis $AL_{TI}$ movable up and down posts 69 while the trailing end of the track assembly 122 is pivoted about a floating horizontal pivot axis $AT_{TI}$ which can be moved up and down the intermediate posts 74. A rear top level movable track assembly 124 is spaced behind the track assembly 122 at the rear end of the trailer. The leading end of the rear track assembly 124 is mounted between the leading support posts 76 in the rear primary support post assembly 75 about a horizontal pivot axis $AL_{TR}$ movable up and down the posts 76. The trailing end of the rear track assembly 124 is pivotally mounted about a swinging horizontal pivot axis $AT_{TR}$ which is mounted for swinging movement from the intermediate side rail sections 50.

Figure 8B:
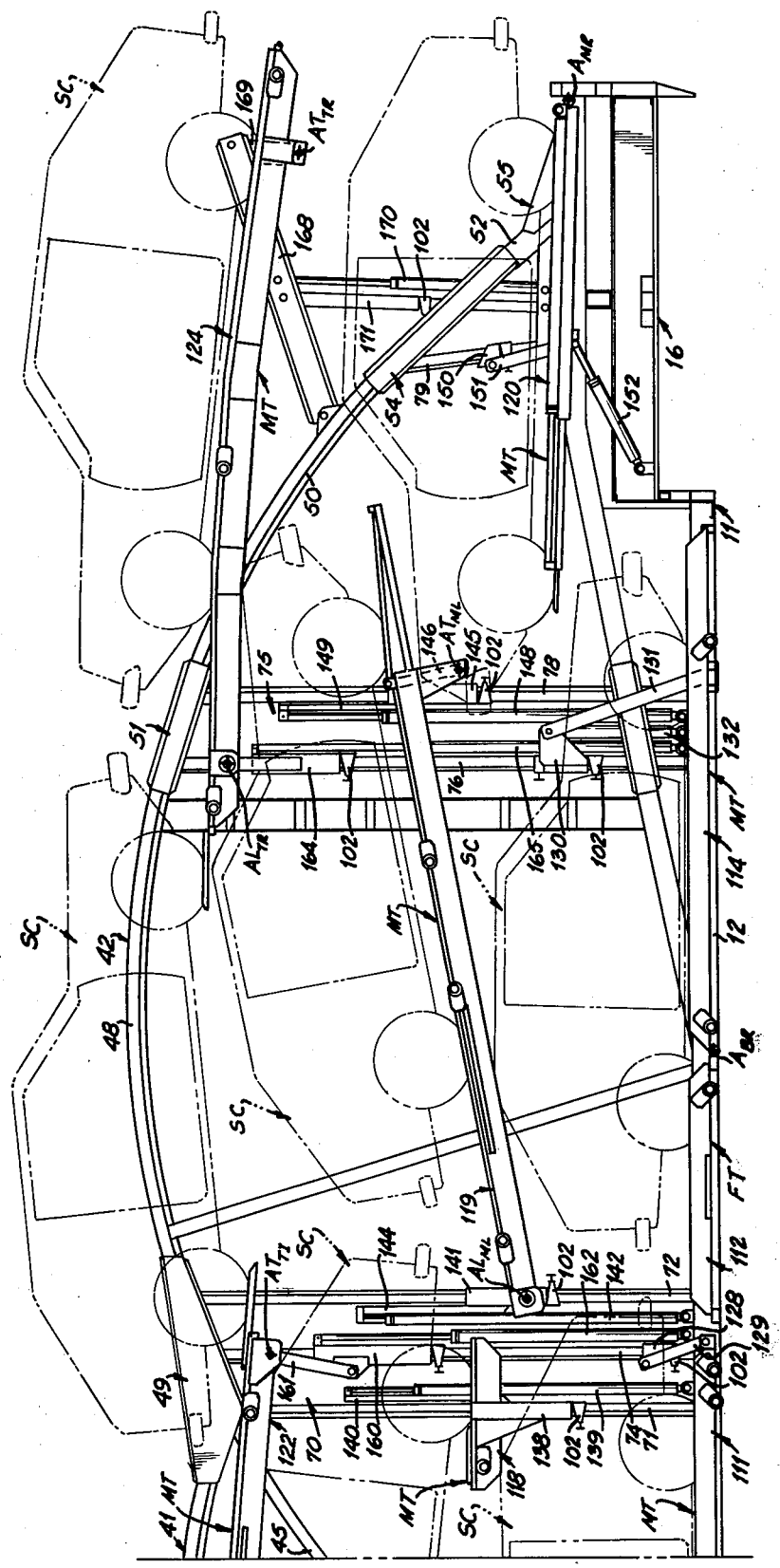

As best seen in FIG. 8B, the intermediate bottom level pivoted track assembly 111 is connected to slide tubes 128 on the intermediate post 74 in the intermediate primary support post assembly 70 through a transfer link 129. Thus, it will be seen that the intermediate bottom level pivoted track assembly 111 can be pivoted about its axis $A_{BI}$ (FIG. 8A) by shifting the slide tube 128 up and down the intermediate post 74. Locking clamps 102 are used to positively locate the position of the slide tube 128 along the posts 74. The intermediate bottom level pivoted track assembly 111 may be moved under power by appropriately hooking the pivoted end of the track assembly 111 to one of the powered track sections with a chain or cable or may be manually positioned until the locking clamps 102 can be installed to positively lock the slide tubes 128 in place. Usually, the vehicle is loaded onto the intermediate bottom level track assembly 111 and then the track assembly 111 pivoted into the position so that it can be locked by the locking clamps 102.

The rear bottom level pivoted track assembly 114 (FIG. 8B) is connected to slide tube assemblies 130 by transfer links 131 with the slide tube assemblies 130 being slidably mounted on the leading support posts 76 in the rear primary support post assembly 75 so that, as the slide tube assemblies 130 are moved up and down the support posts 76, the rear bottom level track assembly 114 will be pivoted about its pivot axis $A_{BR}$. Each slide tube assembly 130 is powered by positioning cylinders 132 pinned between the frame side rails 12 and the slide tube assemblies 130.

The forward middle level pivoted track assembly 115 (FIG. 8A) is connected slide tubes 134 by transfer links 135. The slide tubes 134 are slidably positioned on the leading support posts 68 of the front primary support post assembly 66 so that the forward middle level track assembly 116 is pivoted about its pivot axis $A_{MF}$ as the slide tubes 134 are moved along the length of the posts 68. Positioning cylinders 136 pinned between the gusset assemblies 46 and the slide tubes 134 selectively shift the slide tubes 134 along the posts 68 to selectively pivot the forward track assembly 116.

The intermediate middle level short track assembly 118 (FIG. 8B) is fixedly mounted between slide tubes 138 slidably mounted on the leading posts 71 of the intermediate primary support posts assembly 70 so that the short track assembly 118 is moved vertically up and down as the slide tubes 138 are axially moved along the posts 71. Positioning cylinders 139 pinned to the trailer frame side rails 12 and to the slide tubes 138 through upright extensions 140 drive the slide tubes 138 and thus the intermediate middle level short track assembly 118 up and down along the posts 71. The cylinder rods on cylinders 139 and the extensions 140 can extend up through the front openings 91 through the gusset assemblies 49 as seen in FIG. 3 to fully raise the short track assembly 118. The rods and extensions reach the height H, seen in FIG. 2B when fully extended. It will be noted that the intermediate middle level short track assembly 118 is maintained generally horizontal at all times.

The leading end of the intermediate middle level long track assembly 119 (FIG. 8B) is pivotally mounted between slide tubes 141 about the forward axis $AL_{ML}$ with the slide tubes 141 being slidably mounted on the trailing posts 72 of the intermediate primary support post assembly 70 so that the pivot axis $AL_{ML}$ is shifted vertically up and down the posts 72 as the slide tubes 141 are moved along the posts. Positioning cylinders 142 pinned to the trailer side rails 12 and to the slide tubes 141 through extensions 144 slidably position the slide tubes 141 along the length of the posts 72. This positions the front pivot axis $AL_{ML}$ of the intermediate middle level long track assembly 119. The cylinder rods on cylinders 139 and the extensions 144 can extend up through the rear openings 92 in the gusset assemblies 49 as seen in FIG. 3 to fully raise the axis $AL_{ML}$ of track assembly 119. The rods and extensions reach height $H_2$ seen in FIG. 2B when fully extended.

The trailing end of the intermediate middle level long track assembly 119 (FIG. 8B) is pivotally connected to slide tubes 145 through transfer links 146. The slide tubes 145 are slidably mounted on the trailing posts 78 of the rear primary support post assembly 75 so that, as the slide tubes 145 are moved up and down the support posts 78, the rear pivot axis $AT_{ML}$ of the long track assembly 119 will be shifted vertically along the posts 78. It will also be noted that the transfer links 146 permit the rear pivot axis $AT_{ML}$ to shift fore and aft with respect to the trailer since the distance between the forward pivot axis $AL_{ML}$ and the rear pivot axis $AT_{ML}$ remains constant. The slide tubes 145 are positioned by positioning cylinders 148 which are pinned to the trailer frame side rails 12 and to the slide tubes 145 through extensions 149. The cylinder rods of cylinders 148 and the extensions 149 can extend through the opening 95 (FIG. 4) in the gusset assembly 51 to fully raise the pivot axis $AT_{ML}$. The rods and extensions 148 reach height $H_3$ when fully extended as seen in FIG. 2B.

The rear middle level pivoted track assembly 120 (FIGS. 8B and 5) is connected to a pair of slide tubes 150 by transfer links 151. The tubes 150 are slidably mounted along the rear support posts 79 so that, as the slide tubes 150 slide along the support posts 79, the rear track assembly 120 will be pivoted about its pivot axis $A_{MR}$. The pivotal position of the rear middle level track assembly 120 is powered through positioning cylinders 152 connected between the pivoted end of the rear track assembly 120 and the axle frame assembly 16. The slide tubes 150 permit the rear track assembly 120 to be locked in position through posts 79 and locking clamps 102 best seen in FIG. 5.

The front top level skid support assembly 121 (FIG. 8A) is connected to a pair of slide tubes 154 mounted on the front support posts 65 through transfer links 155 so that, as the slide tubes 154 are moved along the posts 165, the transfer links 155 will cause the front top level skid support assembly 121 to be pivoted about its pivot axis $A_{TF}$. The slide tubes 154 are positioned by positioning cylinders 156 pinned between the slide tubes 154 and the king pin frame assembly 15.

The intermediate top level track assembly 122 (FIGS. 8A and 8B) is connected adjacent its leading end to slide tubes 158 slidably mounted on the trailing support posts 69 in the front primary support post assembly 66 so that, as the slide tubes 158 are moved along the posts 69, the front pivot axis $AL_{TI}$ of the intermediate top level assembly 122 will be moved up and down therewith. Positioning cylinders 159 pinned between the secondary side rail 45 at its front end and the slide tubes 158 position the slide tubes 158 and thus the axis $AL_{TI}$ along the posts 69.

The rear end of the track assembly 122 is connected to a pair of slide tubes 160 by transfer links 161. The slide tubes 160 are slidably mounted on the intermediate posts 74 in the intermediate primary support post assembly 70 so that, as the slide tubes 160 move up and down the posts 74, the rear pivot axis $AT_{TI}$ of the intermediate track assembly 122 will be shifted vertically up and down the posts 74 while the transfer links 161 permit fore and aft shifting of the pivot axis $AT_{TI}$ to accommodate the constant distance between the front pivot axis $AL_{TI}$ and the rear pivot axis $AT_{TI}$. The slide tubes 160 are positioned by positioning cylinders 162 pinned between the slide tubes and the trailer frame side rails 12.

The leading end of the rear top level track assembly 124 (FIG. 8B) is pivotally connected to slide tubes 164 which are slidably mounted on the leading support posts 76 of the rear primary support post assembly 75. Thus, it will be seen that, as the slide tubes 164 move up and down the posts 76, the front pivot axis $AL_{TR}$ of the track assembly 122 will be shifted vertically along the posts 76. Positioning cylinders 165 pinned to the trailer frame side rails 12 and the slide tubes 164 power the slide tubes 164 to position the leading axis $AL_{TR}$ of the track assembly 124.

The rear end of the rear top level track assembly 124 is connected to positioning links 168 through transfer links 169. The links 168 are pivotally mounted on the rear portion of each rear primary side rail assembly 42. Thus, as the positioning links 168 pivot on the side rail assemblies 42, the rear pivot axis $AT_{TR}$ of the track assembly 124 will be moved up and down with the transfer links 169 allowing fore and aft movement of the axis $AT_{TR}$ to accommodate the constant distance between the front pivot axis $AL_{TR}$ and the rear pivot axis $AT_{TR}$ of the track assembly 124. Positioning cylinders 170 pinned between the rear gusset assembly 55 and the positioning links 168 selectively position the links 168. An extendable locking tube 171 is provided so that the position of the links 168 can be locked using the locking clamps 102 on the locking tube 171.

For sake of clarity, the various extremes of the movement are shown by the points on FIG. 2. The lower extreme points of movement have been labelled $P^L$ while the upper extreme points of movement have been labelled $P^U$. These points have further been labelled as the number of the track assembly associated therewith. The points of those track assemblies with floating pivot points have additionally been labelled with $P_1$ when the non-floating pivot is low and $P_2$ when the non-floating pivot is high. For instance, the position of axis $AT_{ML}$ on track assembly 119 when the front axis $AL_{ML}$ is low and the rear end of the track assembly is low is labelled $P_1^L$.

Figure 11:
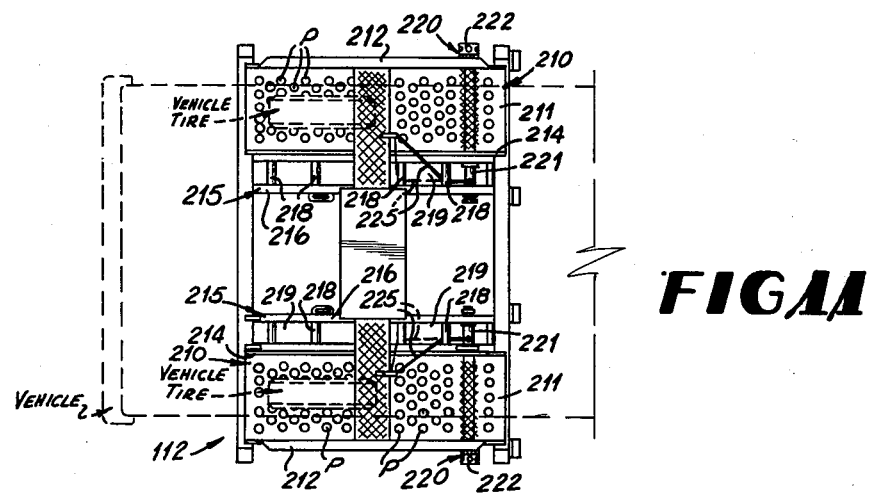
FIG. 11 is an enlarged partial top view of one of the track assemblies showing the track and tie down construction.
Figure 12:
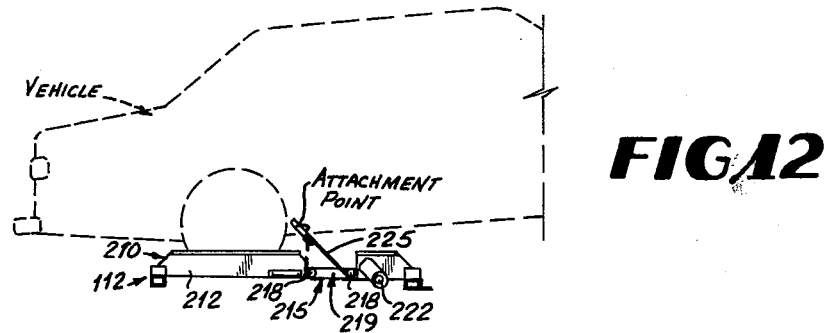
FIG. 12 is a cross-sectional view taken along line 12—12 in FIG. 11 showing a vehicle tied down on the track assembly.

Each of the movable and fixed track assemblies are equipped with spaced apart tracks 210 best illustrated in FIGS. 11 and 12 which extend generally longitudinally of the trailer 10 and which are spaced apart the proper distance to receive the tires of the vehicles to be transported. Each of the tracks 210 has a central tire support section 211 that supports the tires, an outside leg 212 integral with the outside edge of the tire support section 211 and extending therefrom in a generally vertical plane. The central tire support section may be perforated as indicated at p in FIG. 11 to reduce the weight thereof. Other weight reducing configurations may be used. An upstanding lip 214 is integral with the inside edge of the tire support section 211 and projects upwardly therefrom to mount a tie down assembly 215 for tying down the vehicle on the track 210.

The tie down assembly 215 in FIGS. 11 and 12 includes a pair of side tubes 216 held in a spaced apart position by chain guide tubes 218 at spaced apart positions along the length of and welded between the side tubes 216. The guide tubes 218 are oriented generally normal to the path of movement of the trailer 10 while the side tubes 216 are generally parallel to the path of movement. The outside side tube 215 is welded to the upstanding lip 214 along the length of the track 210 so that one tie down assembly 215 is located just inboard of each track 210. The side tubes 216 and chain guide tubes 218 thus define a series of spaced apart chain receiving spaces 219 through the assembly 215.

One or more ratchet mechanisms 220 are mounted on the track 210 and the tie down assembly 215 so that the ratchet winding shaft 221 is operatively associated with the chain guide tubes 216. The winding shaft 221 may be located above, below, in front of, in back of or in the same plane with the chain guide tubes 218 and still operate. The ratcheting device 222 on mechanism 220 is of conventional construction and will not be described in detail. It is sufficient to say that each ratchet mechanism 220 allows the winding shaft 221 to turn in only one direction to tighten the member attached thereto and can only be loosened by releasing the ratcheting device 222.

As seen in FIG. 12, a flexible tensioning member 225, such as a chain or cable, is attached at one of its ends to the winding shaft 221 so that the member 225 will be wound around the shaft 221 as the mechanism 220 is rotated. In transporting vehicles, it is necessary to tie down all four corners of the vehicle. The tensioning members 225 are attached to the vehicle as seen in FIG. 12 at the attachment points provided by the manufacturer. Before the tensioning members 225 are attached, they are each passed through a selected one of the spaces 219 in the tie down assembly 215 so that, as the members 225 are tightened by the ratchet mechanisms 220, the guide tubes 218 direct the net forces applied to the vehicle through the tensioning members 225. This allows the forces applied to the vehicle by the tensioning members to be properly arranged in opposition to each other as is required by good tie down practice. The number and spacing of the guide tubes 218 are such that the personnel loading the trailer 10 can easily locate the required tube 218 to properly tie down the vehicle. While various spacings may be used, a spacing of six-eight inches has been found adequate.

This basic construction is applied to all of the track assemblies and will not be repeated for each. In addition to this basic track/tie down construction, a number of the different track assemblies have special features which will be described.

Figure 10A:
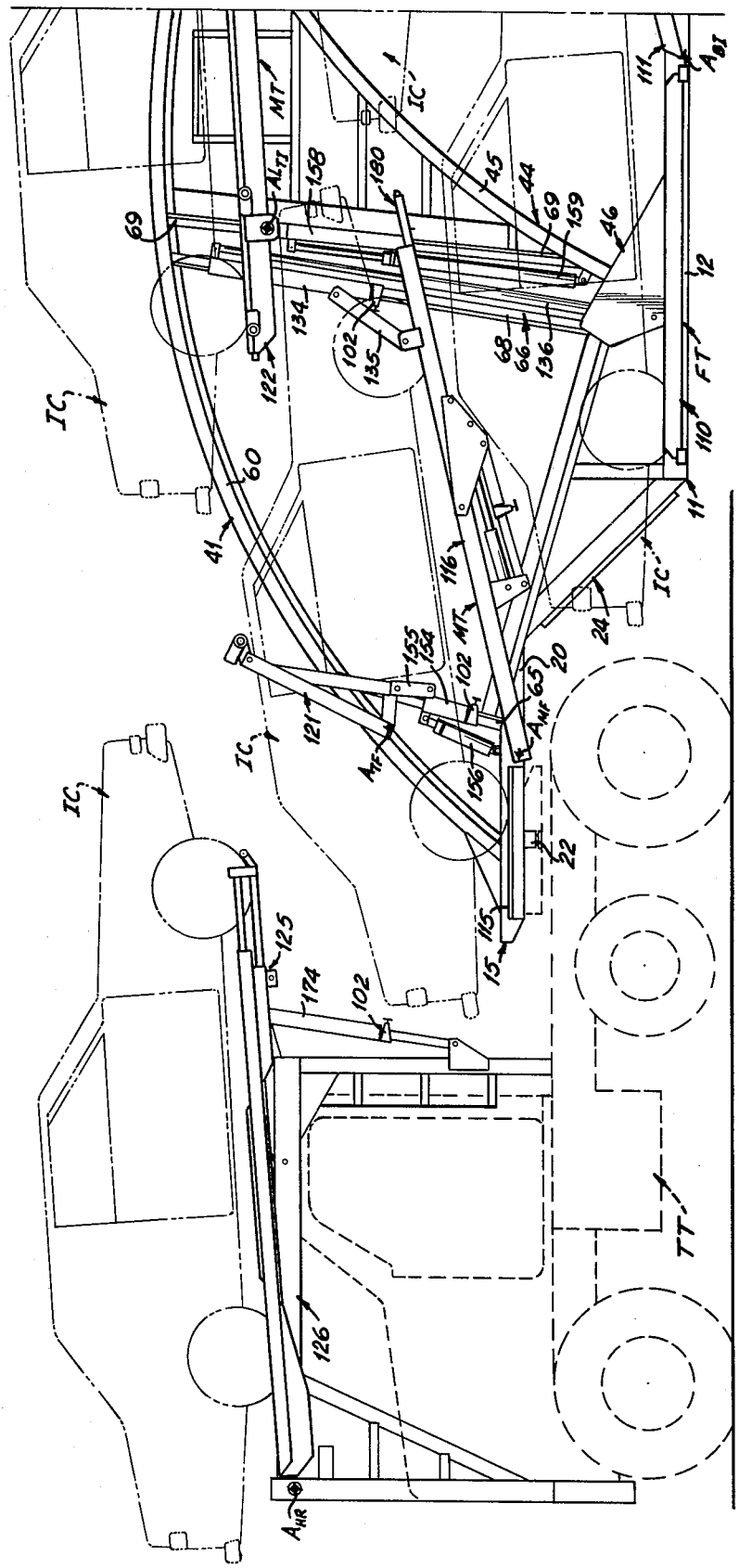
FIGS. 10A and 10B are a matched view similar to FIG. 8 showing the track assemblies positioned for hauling intermediate size cars.
Figure 10B:
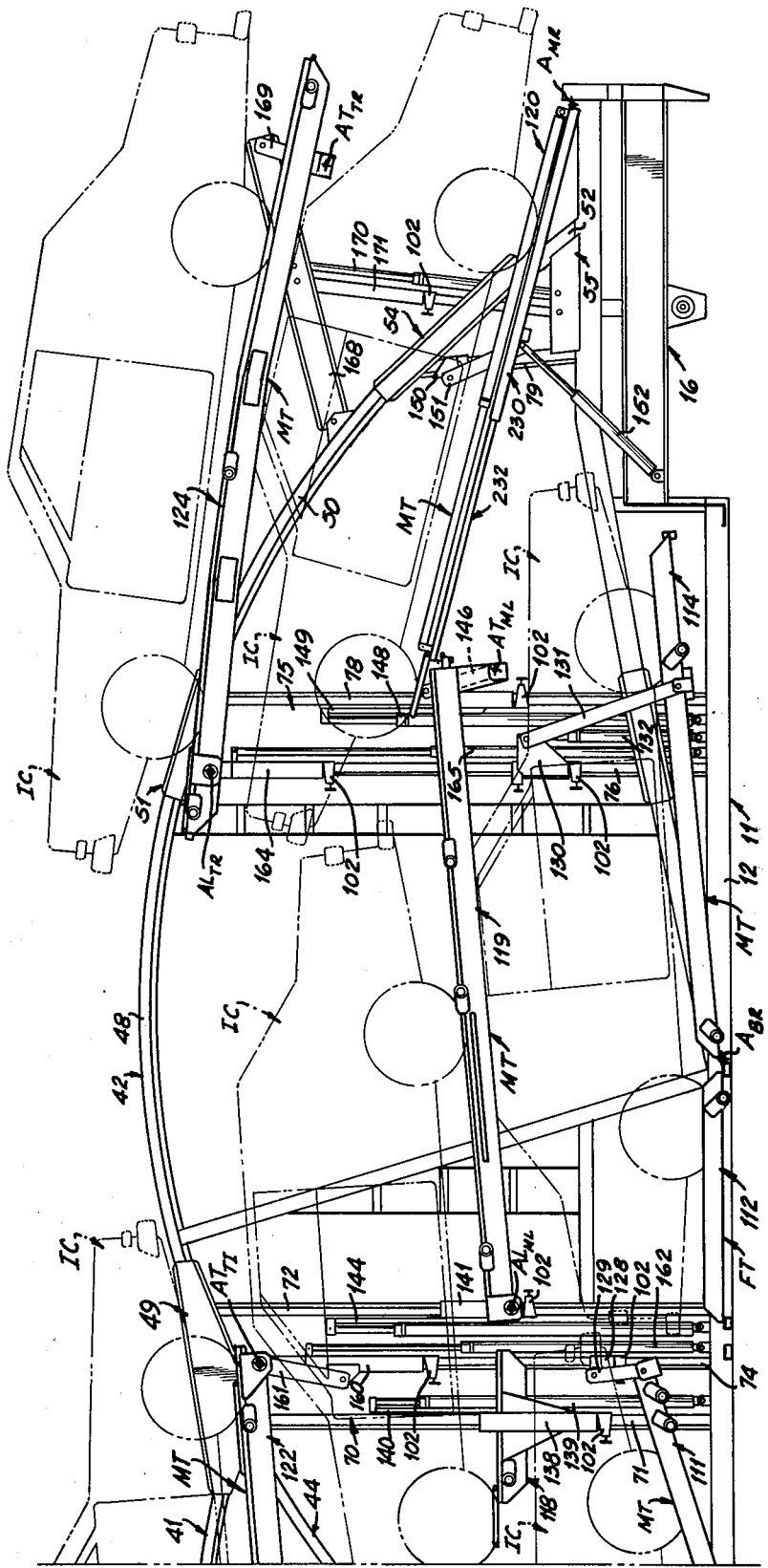

The forward middle level pivoted track assembly 116 is double-acting with a primary track subassembly 180 at its rearwardly extended pivoted end and a secondary track subassembly 181 between the subassembly 180 and the pivot axis $A_{ML}$ as best seen in FIGS. 13 and 14. The subassemblies 180 and 181 allow the assembly 116 to be used simultaneously with the front fixed track assembly 115 and the intermediate short track assembly 118 to support two small cars as seen in FIG. 8. The assembly 116 can also be used with the front fixed track assembly 115 to support longer cars and/or trucks as seen in FIG. 10 or with the forward bottom level track assembly 110 to support longer cars and/or trucks. Thus, it will be seen that the track assembly 116 can be used with both the middle level track assemblies and the bottom level track assemblies thus giving maximum versatility.

Both subassemblies 180 and 181 are pivoted about the fixed axis $A_{ML}$. The primary subassembly 180 has a U-shaped track frame 182 with rear cross beam 184 and a pair of spaced apart side beams 185 extending from opposite ends of cross beam 184 forwardly to the pivot axis $A_{ML}$ to define an open space 186 therein in which is positioned the secondary subassembly 181 for pivotal movement about axis $A_{ML}$. The cross beam 184 mounts short tracks 210 with tie down assemblies 215. The primary subassembly track frame 182 is pinned to the transfer links 135 so that the primary subassembly 180 is directly pivoted about axis $A_{ML}$ as the slide tubes 134 are positioned by cylinders 136.

The secondary subassembly 181 has longer tracks 210 equipped with tie down assemblies 215. The tracks 210 in subassembly 181 are connected by cross beam 188 so that they pivot as a unit about axis $A_{ML}$ in space 186. The cross beam 188 is connected to the side beams 185 by positioning assembly 190 which pivots the secondary subassembly 181 with respect to the primary subassembly 180. The positioning assembly 190 includes drive plate units 191 with a generally triangular shape that are pivoted on side beams 185 of the track frame 182 of the primary track subassembly 180. The plate units 191 are connected to the secondary track subassembly 181 through transfer links 192. The drive plate units 191 are positioned by positioning cylinders 194 between the drive plate units 191 and the side beams 185 of the primary track subassembly 180. An extendable locking tube 195 also connects the drive plate units 191 with the side beams 185 of the primary track subassembly 180 to selectively lock the drive plate units 191 in position. Thus, it will be seen that, as the slide tubes 134 are moved along the posts 68 by the positioning cylinders 136, the primary track subassembly 180 will be moved thereby while the secondary track subassembly 181 will also pivot therewith. The positioning cylinders 194, however, can move the drive plate units 191 to position the secondary track subassembly 181 with respect to the primary track subassembly 180.

It will also be noted that the tracks 210 on the secondary subassembly 181 are not flat but undulating to define a forward depression 196 in the vicinity of the cross beam 188. That portion of the tracks 210 on the subassembly 181 adjacent the pivot axis $A_{ML}$ are provided with pockets 198 to be used to lower the wheels of the vehicle as seen in FIG. 9.

The intermediate middle level long track assembly 119 seen in FIGS. 15 and 16 is provided at its rear end with an extension assembly 200 so that the effective length of the track assembly 119 may be extended. The extension assembly 200 includes a pull-out frame 201 slidably mounted in the rear end of the track assembly 119 so that it can be manually pulled out to an extended position seen in FIGS. 8B, 15 and 16. A pivoted extension plate assembly 202 is provided to extend between the rearwardly projecting end of the pull-out frame assembly 201 and the rear end of the track assembly 119 to support the vehicle as will become more apparent. Lock pins 204 keep frame 201 in place. The extension plate assembly includes sections of the track 210 with tie down assemblies 215. The extension assembly 200 is shown in use in FIG. 8B.

The rear middle level pivoted track assembly 120 is collapsible from an extended position seen in FIG. 18 to a retracted position seen in FIG. 17. Track assembly 120 has a relatively short base subassembly 230 pivoted about axis $A_{MR}$, positioned by cylinders 152 and locked in different pivotal positions with slide tubes 150 and clamps 102. Base subassembly 230 has track sections 210 and tie down assemblies 215 to support the tires of the vehicles. Support tubes 231 are provided on opposite sides of the subassembly 230 that slidably mount an extension subassembly 232 for coplanar sliding extension from and retraction into the the base subassembly 230. The extension subassembly 232 has slide 234 thereon which slideably extend into the support tubes 231 to movably mount the extension subassembly 232 on the base subassembly 230. Tracks 210 and tie down assemblies 215 on the extension subassembly 232 pass under the tracks 210 and tie down assemblies 215 on the base subassembly 230 as the subassembly 232 is retracted. The length of the track assembly 120 is about doubled between the extended and retracted positions of the extension subassembly 232. The extension subassembly 232 is slidably positioned by a pair of positioning cylinders 235 pinned between the base subassembly 230 and the extension subassembly 232. It will be seen that the track assembly 120 can be pivoted up and extended to allow assembly 120 to be used with the middle level track assemblies as seen in FIG. 10 or lowered to its horizontal position and retracted to be used with the bottom level track assemblies.

Several of the track assemblies are provided with short, manually pivoted, extender assemblies 236 which can be pivoted to an extended position to extend the effective length of the track assemblies for a short distance. FIGS. 19 and 20 of the drawings illustrate pivoted extender assembly 236 on the trailing end of the intermediate top level track assembly 122. The extender assembly 236 includes track plates 238 pivoted adjacent the trailing ends of the tracks 210 on the track assembly 122 directly on top of tracks 210 about axis $A_{TP}$. When the track plates 238 are manually folded out as seen in FIG. 19, the track 210 supports plate 238 coplanar therewith and projecting out over the trailing end of the track 210. When the plates 238 are manually folded in, they overlie and rest on the track 210 forward of the axis $A_{TP}$.

Tie down extensions 240 are provided at the trailing end of the track assembly 122 adjacent the tie down assembly 215 mounted on track 210. The tie down extension 240 includes a pivot tube 241 mounted beside the inboard side tube 216 on the tie down assembly 215. The pivot tube 241 rotatably and slidably mounts a pivot rod 242 therein which mounts one end of an extension chain guide tube 244 at the rear end thereof. The other end of the tube 244 mounts an extension side tube 245 which extends away from the chain guide tube spaced from and coplanar with rod 242. The forwardly extending end of the side tube 245 mounts a locating rod 246 therein sized so that the tie down extension 240 can be pulled rearwardly, rotated from the solid line position to the dashed line position seen in FIG. 19, and then pushed forwardly to insert the rod 246 into the inboard side tube 216 on the tie down assembly 216. This allows the tie down capability to be extended to the extender assembly 240. Several of the other track assemblies use these extender assemblies 240 as best seen in FIG. 8.

It will also be noted that skids SK may be used between the track assemblies to extend their capabilities. The skid SK are seen in FIG. 8A extending between the front skid support assembly 121 and the leading end of the intermediate track assembly 122.

The truck tractor TT is provided with a head ramp track assembly 125 pivotally mounted over the tractor cab by a head ramp frame 126 about a horizontal pivot axis $A_{HR}$. The head ramp track assembly 125 serves to mount one of the vehicles to be transported as is conventional in the car haul art. The head ramp track assembly 125 is pivotally positioned by a pair of positioning cylinders 172 pinned between the head ramp track assembly 125 and the head ramp frame 126 so that the positioning cylinders 172 pivot the head ramp track assembly 125 about its pivot axis $A_{HR}$. Extendable locking tubes 174 also connect the head ramp track assembly 125 with the head ramp frame 126 so that the position of the head ramp track assembly 125 can be locked with the locking clamps 102 on the locking tubes 174. The head ramp track assembly 125 can also be extended rearwardly in conventional manner.

It will thus be seen that the track assemblies 110–112, 114–116, 118–122, and 124 together with the head ramp track assembly 125 can be positioned in various positions to haul different loads of vehicles. As seen in FIG. 8, the track assemblies can be positioned to carry nine small cars SC on the trailer 10 and one small car on the head ramp track assembly 125. The track assemblies can be rearranged so that the trailer will carry four long wheelbase vans LV as seen in FIG. 9, with one of the long wheelbase vans being carried on the head ramp track assembly 125. The track assemblies can further be rearranged to carry seven intermediate size cars on the trailer 10 as seen in FIG. 10, with one intermediate size car being carried on the head ramp assembly 125. In similar manner, the track assemblies may be rearranged to carry six full size cars (not shown) with one full size car carried on the head ramp track assembly 125. Similarly, the track assemblies may be rearranged to carry five pickup trucks with one pickup truck carried on the head ramp track assembly 125. Further, it will be seen that the track assemblies may be rearranged to carry different combinations of different loads. It will further be appreciated that each of the loads mentioned can be carried by the trailer 10 and tractor TT without exceeding the height limits and the length limits specified by government regulations. For instance, in Georgia, the height limit is 13 feet 6 inches while the length limit is 60 feet. The order in which the vehicles are loaded in each load configuration are indicated by the numbers on the side of the vehicles.

We claim:

1. A car haul trailer for transporting vehicles comprising:

a base frame having a front end and a rear end;

a pair of spaced apart side frames assemblies mounted on said base frame along opposite sides thereof; each of said frame assemblies including an upstanding, arched primary side rail having opposite ends and a first prescribed radius of curvature, one end of said primary side rail connected to said base frame adjacent the rear end thereof and the other end of said primary side rail connected to said base frame intermediately of the rear and front ends thereof so that said primary side rail projects above said base frame and lies in a generally vertical plane; an upstanding arched secondary side rail having opposite ends and a second prescribed radius of curvature, one end of said secondary side rail connected to said base frame adjacent the front end thereof; and a gusset assembly connecting the other end of said secondary side rail to said primary side rail intermediate its ends; and a plurality of vehicle supporting track assemblies positioned between and mounted on said side frames to support the vehicles to be transported, said gusset assemblies connecting said secondary side rails to said primary side rails so that forces exerted on said secondary side rails by said track assemblies and directed along said secondary side rails generally toward the rear end of said base frame will be transferred through said gusset assemblies to said primary side rails and along said primary side rails to said base frame adjacent the rear end thereof and so that forces exerted on said primary side rails by said track assemblies rearwardly of said secondary side rails directed along said primary side rails generally toward the front end of said base frame will be directed to said base frame partly through said gusset assemblies and said secondary side rails to said base frame adjacent the front end thereof and partly through said primary side rails to said base frame intermediate the ends thereof.

2. The car haul trailer of claim 1 wherein each of said side frames further includes a plurality of upstanding support posts extending between said base frame and said arched side rails and movably supporting at least some of said vehicle supporting track assemblies therebetween so that the height of each of said track assemblies above said base frame is vertically adjustable.

3. A track assembly for use on a car haul trailer to support vehicles for transport on the car haul trailer including:

a primary subassembly adapted for pivotal movement about a primary pivot axis, said primary subassembly including a U-shaped frame comprising a central section and a pair of spaced apart side sections at opposite ends of said central section, said side sections pivoted about said primary pivot axis at their ends opposite said central section and said frame defining an open space therein between the primary pivot axis and the central section thereof;

a secondary subassembly pivotally mounted in the open space in said primary subassembly for pivotal movement about said primary pivot axis so that said secondary subassembly is pivotal with respect to said primary subassembly; and interconnect means connecting said secondary subassembly with said primary subassembly so that said secondary subassembly is pivoted with said primary subassembly as said primary subassembly is pivoted about said primary pivot axis, said interconnect means further selectively pivoting said secondary subassembly about said primary pivot axis with respect to said primary subassembly.

4. A mechanism for selectively securing a wheeled vehicle through attachment points on a vehicle to a hauling trailer for transportation thereon including a pair of spaced apart track sections for supporting at least one pair of wheels on opposite sides of the vehicle;

a tie down assembly operatively associated with said track sections, said tie down assembly comprising:

at least one frame member defining an open space along the length thereof, a plurality of guide members mounted on said frame member and extending across said open space at spaced apart intervals to divide said open space into a plurality of subspaces, at least one flexible member adapted to be attached at one of its ends to one of the attachment points on the vehicle;

at least one tensioning mechanism connected to the opposite end of said flexible member to selectively take up said flexible member so that that end of said flexible member to be attached to the vehicle can be passed around a selected one of said guide members through the subspace associated therewith, then attached to the attachment point on the vehicle, and said tensioning mechanism used to tighten said flexible member to apply a force to the vehicle directed toward said track section whose angle is determined by said guide member selected around which said flexible member extends.

5. A car haul trailer for transporting vehicles comprising:

a trailer frame including upright support posts therein; a top rail connected to the top of said support post, and having a section thereof omitted adjacent said support post; and a gusset assembly connecting those ends of said side rail across the omitted section to define a vertically extending opening therethrough adjacent said support post;

at least one track assembly; and a positioning mechanism connecting said track assembly to said support post for movement therealong to position said track assembly, said positioning mechanism including a slide tube slidably mounted on said support post and connected to said track assembly, a positioning cylinder having an extendable piston rod positioned adjacent said support post, and an extension member connecting said piston rod to said slide tube, said extension member extending above said slide tube, and said extension member and said piston rod in vertical registration with said opening through said gusset assembly so that said piston rod and said extension can extend through said vertically extending opening through said gusset assembly above said trailer frame as said slide tube approaches the upper limit of its travel along said support post to increase the effective range of movement of said slide tube along said support post by said positioning cylinder.

6. A car haul trailer for transporting vehicles comprising:

a trailer frame assembly having a longitudinal axis;

a plurality of vehicle supporting track assemblies mounted in said trailer frame assembly to support vehicles to be transported, at least one of said vehicle supporting track assemblies including a primary subassembly pivotally mounted on said trailer frame about a primary pivot axis oriented generally normal to the longitudinal axis, said primary subassembly comprising a U-shaped frame including a central section and a pair of spaced apart side sections at opposite ends of said central section, said side sections pivoted about said primary pivot axis at their ends opposite said central section and said U-shaped frame defining an open space between said central section and said primary pivot axis;

a secondary subassembly pivotally mounted in the open space in said primary subassembly for pivotal movement about said primary pivot axis so that said secondary subassembly is pivotal with respect to said primary subassembly; and interconnect means connecting said secondary subassembly with said primary subassembly so that said secondary subassembly is pivoted with said primary subassembly as said primary subassembly is pivoted about said primary pivot axis, said interconnect means further selectively pivoting said secondary subassembly about said primary pivot axis with respect to said primary subassembly.

7. The car haul trailer of claim 6 wherein said interconnect means further includes primary positioning means interconnecting said primary subassembly and said trailer frame assembly for selectively pivoting said primary subassembly about said primary pivot axis and secondary positioning means interconnecting said primary subassembly and said secondary subassembly for selectively pivoting said secondary subassembly about said primary pivot axis with respect to said primary subassembly.

8. The car haul trailer of claim 6 wherein said trailer frame assembly includes a base frame and a pair of spaced apart side frames mounted along opposite sides of said base frame; each of said side frames including at least one upstanding, arched primary side rail assembly having a prescribed radius of curvature connected to said base frame at its opposite ends and a secondary upstanding arched side rail member having a prescribed radius of curvature connected to said base frame at one of its ends and connected to said primary side rail assembly at the other of its ends.

9. The car haul trailer of claim 6 wherein at least one of said vehicle supporting track assemblies includes a base subassembly mounted on said trailer frame assembly, an extension subassembly slidably mounted on said base subassembly for co-planar sliding extension from and retraction into said base subassembly, and means for slidably moving said extension subassembly with respect to said base subassembly.

10. The car haul trailer of claim 9 wherein each of said side frames includes a plurality of upstanding support posts and wherein at least one of said vehicle supporting track assemblies is slidably supported on said support posts for vertical adjustment of said track assembly with respect to said base frame.

11. A car haul trailer for transporting wheeled vehicles with attachment points for securing the vehicles comprising:
   a trailer frame assembly;
   a plurality of vehicle supporting track assemblies mounted on said trailer frame assembly, each of said vehicle supporting track assemblies including spaced apart track sections for supporting at least one pair of wheels on opposite sides of the vehicle; and
   a plurality of tie down assemblies associated with said track sections on said vehicle supporting track assemblies, each of said tie down assemblies including at least one frame member defining an open space along the length thereof, a plurality of guide members mounted on said frame member and extending across said open space at spaced apart intervals to divide said open space in a plurality of subspaces, at least one flexible member adapted to be attached at one of its ends to one of the attachment points on the vehicle and at least one tensioning mechanism connected to the opposite end of said flexible member to selectively take up said flexible member so that that end of said flexible member to be attached to the vehicle can be passed around a selected one of said guide members through the subspace associated therewith, then attached to the attachment point on the vehicle, and said tensioning mechanism used to tighten said flexible member to apply a force to the vehicle directed toward said track sections whose angle is determined by said guide member selected around which said flexible member extends.

12. The car haul trailer of claim 11 wherein at least one of said vehicle supporting track assemblies includes track extension means for effectively extending the length of said track sections on said track assembly and wherein each of said tie down mechanisms associated with said track assembly includes guide extension means for extending the effective length of said frame member to correspond to said track extension means, said guide extension means including at least one of said guide members so that said guide member can be used to control the angle of the force applied to a vehicle supported on said track extension means.

* * * * *